United States Patent
Caliskan et al.

(10) Patent No.: US 7,436,789 B2
(45) Date of Patent: Oct. 14, 2008

(54) AD HOC WIRELESS NODE AND NETWORK

(75) Inventors: Alaattin Caliskan, Lawrenceville, NJ (US); Paul Hashfield, Princeton Junction, NJ (US); Indur Mandhyan, Princeton, NJ (US); Robert J. Siracusa, Lawrenceville, NJ (US)

(73) Assignee: Sarnoff Corporation, Princeton, NJ (US)

( * ) Notice: Subject to any disclaimer, the term of this patent is extended or adjusted under 35 U.S.C. 154(b) by 839 days.

(21) Appl. No.: 10/900,156

(22) Filed: Jul. 27, 2004

(65) Prior Publication Data
US 2005/0078672 A1 Apr. 14, 2005

Related U.S. Application Data

(60) Provisional application No. 60/510,039, filed on Oct. 9, 2003.

(51) Int. Cl.
*H04B 7/00* (2006.01)
(52) U.S. Cl. ............... 370/310.1; 370/338; 455/41.2
(58) Field of Classification Search ............... 370/310, 370/312, 346, 310.1, 338; 455/41.2
See application file for complete search history.

(56) References Cited

U.S. PATENT DOCUMENTS

| | | | |
|---|---|---|---|
| 5,682,142 A | 10/1997 | Loosmore et al. | |
| 7,171,476 B2 * | 1/2007 | Maeda et al. | 709/227 |
| 2001/0022780 A1 | 9/2001 | Mizutani et al. | |
| 2002/0082035 A1 | 6/2002 | Aihara et al. | |
| 2002/0191573 A1 | 12/2002 | Whitehill et al. | |
| 2003/0035273 A1 | 2/2003 | Frank et al. | |
| 2003/0054767 A1 | 3/2003 | Mandhyan et al. | |
| 2003/0110291 A1 | 6/2003 | Chen | |
| 2003/0157951 A1 | 8/2003 | Hasty, Jr. | |
| 2003/0174682 A1 | 9/2003 | Barker, Jr. | |
| 2003/0202465 A1 | 10/2003 | Cain | |
| 2003/0202468 A1 | 10/2003 | Cain et al. | |
| 2003/0204623 A1 | 10/2003 | Cain | |
| 2003/0204625 A1 | 10/2003 | Cain | |
| 2004/0028023 A1 | 2/2004 | Mandhyan et al. | |

OTHER PUBLICATIONS

Declaration of Alaattin Caliskan and Paul Hashfield Regarding Experimental Use, Sep. 8, 2004 and Sep. 14, 2004.
Curt Franklin, "How Bluetooth Works," http://electronics.howstuffworks.com/bluetooth.htm/printable, 6 pages, Printed Aug. 29, 2003.

* cited by examiner

*Primary Examiner*—Temica M Beamer
(74) *Attorney, Agent, or Firm*—Lowenstein Sandler PC

(57) ABSTRACT

A node is suitable for a wireless network. A wireless network comprises one or more sensor nodes and/or one or more control nodes. In the wireless network, the sensor node transmits in response to a sensed event and/or a request from a control node. A transmission/routing of data between a sensor node and/or a control node may be subject to a policy constraint and a resource constraint.

36 Claims, 13 Drawing Sheets

DM1 PICONETS (108.8 Kbps max)
USING SEVEN SLAVES EQUALLY
AT 15.4 Kbps

M = PICONET MASTER
S = PICONET SLAVE
S/S = SLAVE-SLAVE SCATTERNET RELAY

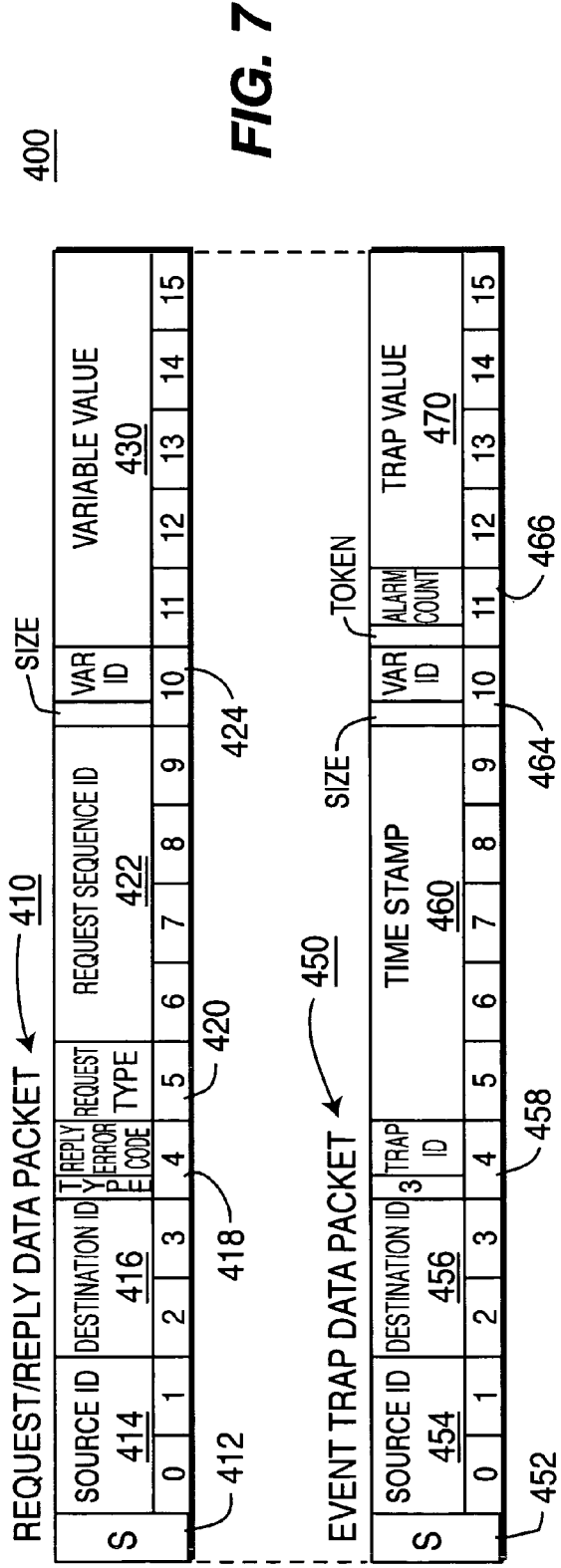

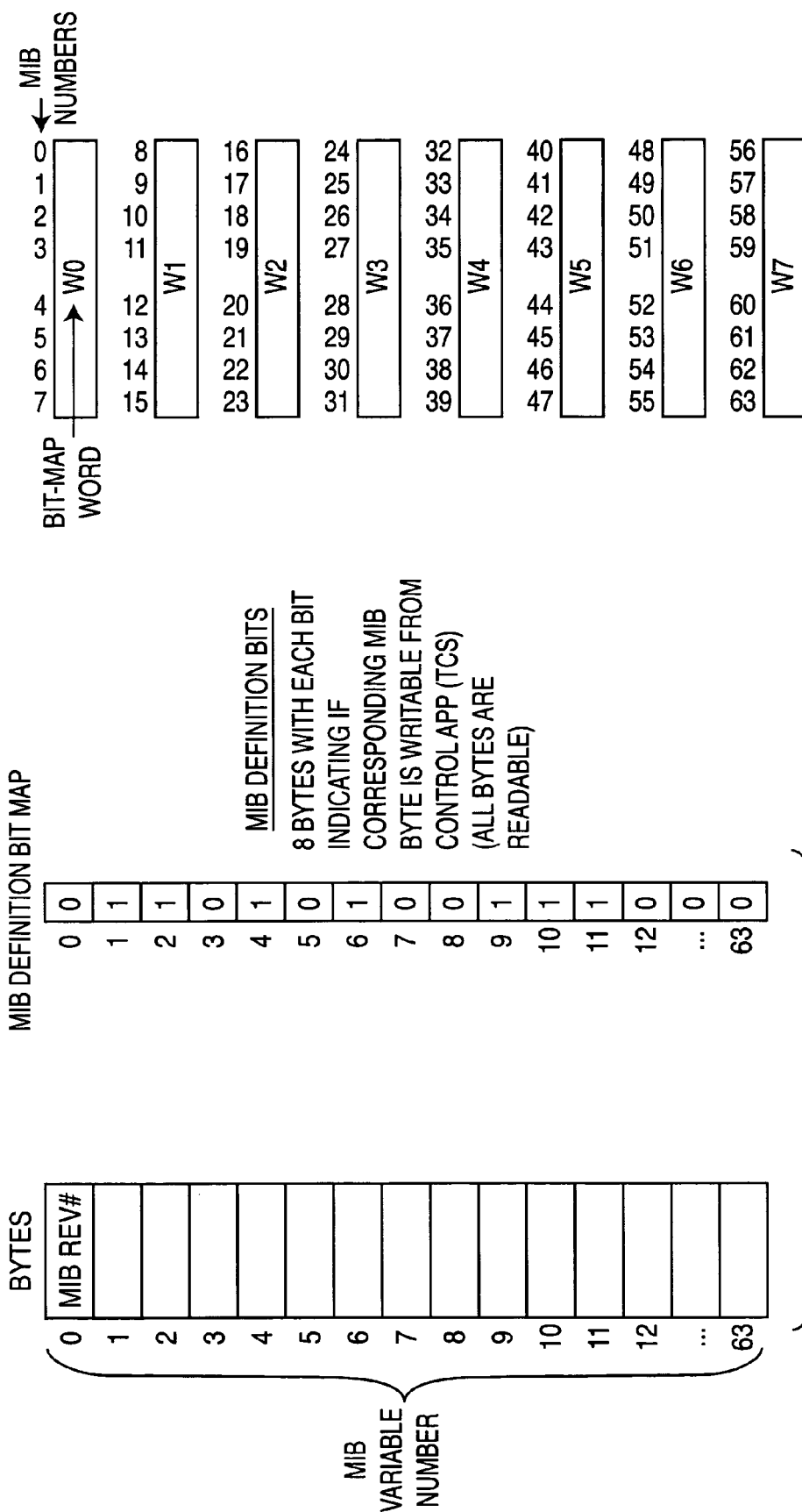

FIG. 15

| FILE NAME | ENTRY POINTS | COMPONENT | CALLS | RETURN TO |
|---|---|---|---|---|
| ISD_SEG0 | EP0P0 | ISD INITIALIZATION | EP0P1 | EP1P0 |
| | | SEND ISD READY PACKET | | |
| | | EXECUTIVE CONTROL LOOP: | | |
| | |   MAINTAIN TIMERS | | |
| | |   PROCESS NEW PACKETS | EP1P1 | EP2P0 |
| | |   GET CURRENT SENSOR DATA | EP0P2 | EP3P0 |
| | |   SEND ALARMS | EP0P3 | EP4P0 |
| | |   SEND STATUS REPORTS | EP0P4 | EP5P0 |
| | | REPEAT CONTROL LOOP | | |
| ISD_SEG1 | EP0P1 | SEND ISD READY PACKET | | |
| | |   RETURN | EP1P0 | |
| | EP1P1 | RECEIVE NEW PACKET | | |
| | | PROCESS PACKET | | |
| | | REPLY TO REQUEST | | |
| | |   RETURN | EP2P0 | |
| | | PACKET PROCESSING: | | |
| | |   ALARM REQUEST CLEAR ALL | EP1P3 | EP2P1 |
| | |   ALARM REQUEST SET | EP2P3 | EP3P1 |
| | |   ALARM REQUEST CLEAR | EP3P3 | EP4P1 |
| | |   STATUS REPORT REQUEST CLEAR ALL | EP1P4 | EP5P1 |
| | |   STATUS REPORT REQUEST SET | EP2P4 | EP6P1 |
| | |   STATUS REPORT REQUEST CLEAR | EP3P4 | EP7P1 |
| ISD_SEG2 | EP0P2 | GET CURRENT SENSOR DATA | | |
| | |   RETURN | EP3P0 | |
| ISD_SEG3 | EP0P3 | SEND ALARMS | | |
| | |   RETURN | EP4P0 | |
| | EP1P3 | ALARM REQUEST CLEAR ALL | | |
| | |   RETURN | EP2P1 | |
| | EP2P3 | ALARM REQUEST SET | | |
| | |   RETURN | EP3P1 | |
| | EP3P3 | ALARM REQUEST CLEAR | | |
| | |   RETURN | EP4P1 | |
| ISD_SEG4 | EP0P4 | SEND STATUS REPORTS | | |
| | |   RETURN | EP5P0 | |
| | EP1P4 | STATUS REPORT CLEAR ALL | | |
| | |   RETURN | EP5P1 | |
| | EP2P4 | STATUS REPORT SET | | |
| | |   RETURN | EP6P1 | |
| | EP3P4 | STATUS REPORT CLEAR | | |
| | |   RETURN | EP7P1 | |

AD HOC WIRELESS NODE AND NETWORK

This Application claims the benefit of U.S. Provisional Application Ser. No. 60/510,039 filed Oct. 9, 2003.

This invention was made with Government support under Contract No. DAAB07-01-9-L504 awarded by the Department of the Army. The Government has certain rights in this invention.

The present invention relates to a wireless network and nodes therefor.

Multi-hop wireless ad hoc networks are used where an existing communications infrastructure either does not exist, or is not adequate. These networks form and maintain themselves autonomously without supervision from a centralized entity, including when new nodes are added, and when existing nodes are removed, relocated or otherwise cease to function. "Multi-hop" routing through intermediate nodes is often utilized to deliver packets of information and/or data to destinations that are not in direct communication range of the sources of the information and/or data.

AODV, DSR, and TORA constitute some of the most popular ad hoc routing protocols. Two simulators, ns-2 and OpNet, are widely utilized because they provide environments for the design, development and testing of such protocols. 802.11 and Linux technologies are established protocol implementations, and the more recent Bluetooth standard, with its very low power consumption and low-cost features, are of interest as platforms for implementations such as Internet access, messaging, cellular telephony, mobile computing and the like.

One disadvantage of conventional wireless routing protocols is their extreme dependence on the underlying radio technology employed. In this context, "radio" implies the Physical Layer and the Data Link Control Layer of the networking stack. The mentioned dependency is created by numerous features of the radio devices that vary tremendously between any of the possible implementation platforms. Many of these features have to be handled separately and in harmony with the rest of the protocol stack. However, the virtually unlimited number of combinations makes this task either impossible or impractical. As a result, the protocol often must be substantially modified each time it is ported to a new platform; for example, from ns-2 to 802.11 on Linux, and then to Bluetooth on an embedded processor. This is because every radio (hardware or simulated) offers its own set of features/capabilities and hence specialized interfaces to access them. Sometimes the modified versions do not even resemble each other, and become viewed as independent protocols. As a result, multiple independently developed platforms inevitably lead to increased complexity and to unnecessary waste of time arising from the repetition of many common tasks.

In addition, conventional sensors are not compatible with the ad hoc networks and have disadvantages of excess power consumption, which limits the useful operating time obtainable on a reasonably-sized battery. In addition, conventional communication protocols contribute to reduced battery operating time where they transmit too often or at inappropriate times. In certain environments where it is not desired that the sensor be easily detectable by monitoring transmissions, unnecessary transmissions not only waste power, but they increase the likelihood of detection.

Accordingly, it would be desirable to have a node and/or an ad hoc wireless sensor network that advantageously couples sensors and networks in a desired manner.

It would further be desirable to have an architecture and methodology that separate the routing protocol from the specifics of radio features and interfaces.

To this end, the present arrangement comprises a node for a wireless network. A wireless network comprises one or more sensor nodes and/or one or more control nodes.

BRIEF DESCRIPTION OF THE DRAWING

The detailed description of the preferred embodiments of the present invention will be more easily and better understood when read in conjunction with the FIGURES of the Drawing which include:

FIG. 7 is a schematic representation of an example STP format for data packets;

FIG. 8 is a schematic representation of example group addresses for $I^2C$ devices;

FIG. 9 is a schematic representation of an example address map of $I^2C$ group addresses;

FIG. 13 is a schematic representation of an example MIB variable storage arrangement;

FIG. 14 is a schematic representation of a definition of an example MIB bit map arrangement; and FIG. 15 is a schematic tabular representation of example segment entry point names for an MIB.

Figure 1:
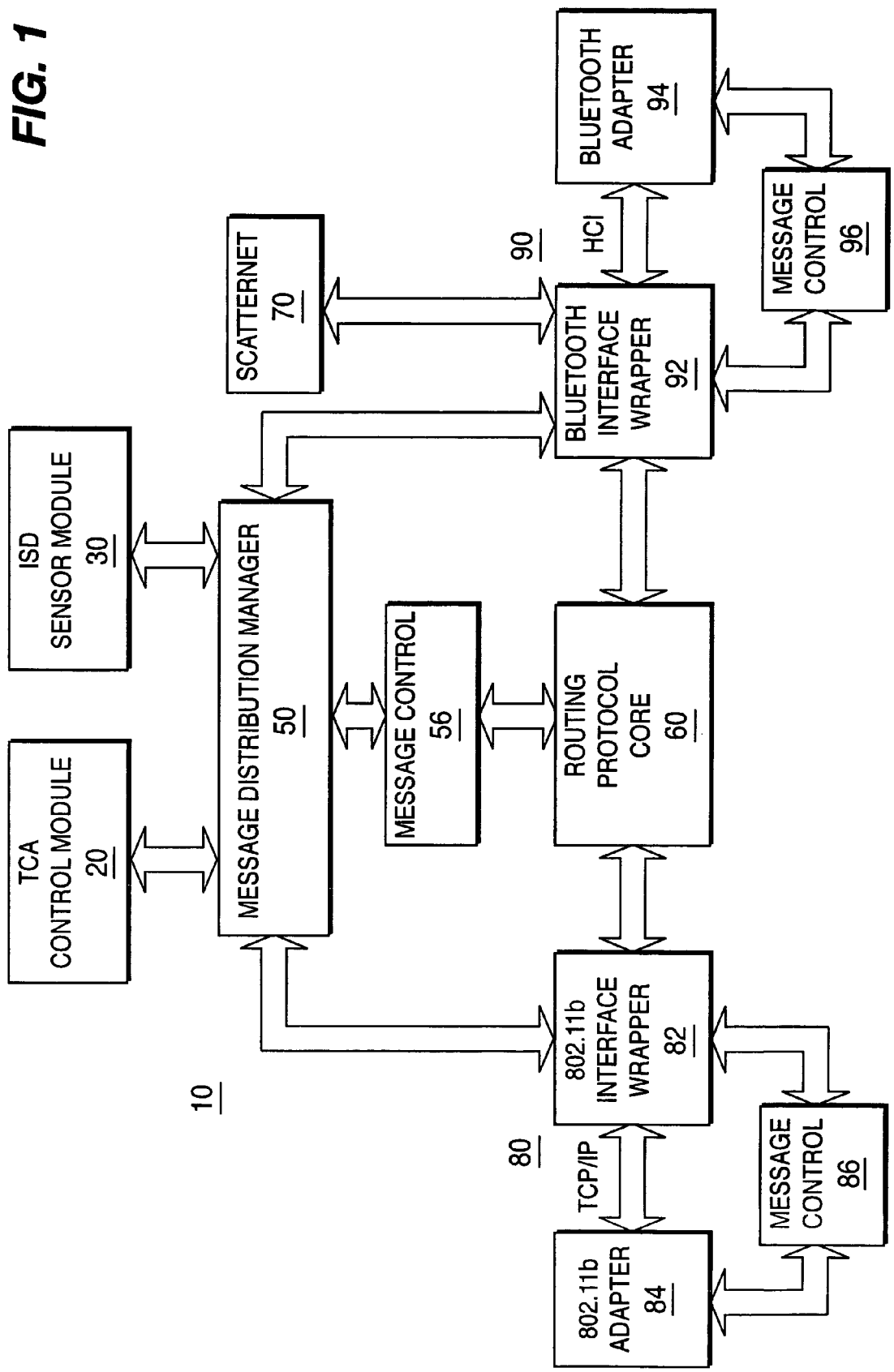
FIG. 1 is a schematic block diagram illustrating an example embodiment of an ad hoc wireless sensor network architecture.

Appendix A hereto is a List of Acronyms and Terms used herein.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. It is noted that, according to common practice, the various features of the drawing are not to scale, and the dimensions of the various features are arbitrarily expanded or reduced for clarity, and any value stated in any Figure is given by way of example only.

DESCRIPTION OF THE PREFERRED EMBODIMENT(S)

System and Software Architecture for an Ad Hoc Sensor Network.

This section describes the system and software architecture of an ad hoc sensor network. An ad hoc network is a collection of autonomous wireless routers that self organize into a network without the use of a pre-existing infrastructure. "Multi-hop" routing through intermediate nodes is often utilized to deliver packets of data to destinations that are not in direct communication range of the sources of data. The example ad hoc sensor network described herein is preferably arranged to carry low rate sensor data, be scalable to thousands of nodes, and conserve power by means of minimizing control traffic and using low power communications interfaces such as Bluetooth. The architecture is preferably independent of the physical layer (i.e. the radio device).

Ad Hoc Sensor Node Architecture

FIG. 1 presents a complete view of the layers and functional software modules comprising an Ad Hoc Networked Node 10, be it a Control Node or a Sensor Node, including a hosted/embedded protocol stack 60. A strong sense of layers exists because the modules are explicitly paired to their counterparts in the OSI stack—the 802.11b and Bluetooth adapters 80, 90 correspond to the Physical and Data Link Control layers, the Core 60 corresponds to the Network Layer, and the Message Distribution Manager 50, ISD 30 and TCA 20 to the Application Layer. Scatternet Manager 70 is a link level entity, used to establish the topology required by the routing protocol 60, hence it may also be considered a part of the Data Link Control Layer.

Each block in FIG. 1 is essentially a distinct process utilizing, e.g., socket or eCOS mailbox based interprocess communications to interact with related modules. For the Linux operating system, Berkeley sockets were chosen since they offer simplified programming under standard APIs, and greater portability across current and future platforms. For eCOS, the standard method of interprocess communications is via mailboxes.

Node 10 of FIG. 1 as shown is a generalized node for all possible embodiments—node 10 may be a control node 10C if it includes TCA module 20 and/or may be a sensor node 10S if it includes ISD module 30. Node 10 may also be a control node with an associated sensor, in which case it includes both TCA 20 and ISD 30. Any of the foregoing embodiments may include an 802.11b link 80 and/or a Bluetooth link 90 and/or another communication link. Where node 10 includes both 802.11b link 80 and Bluetooth link 90, it may serve as a communication interface between the two communication protocols, which is sometimes referred to as an interface node, a relay node and/or a bridge node. Node 10 may also be a communication interface and/or relay node and/or bridge node, in which case it includes both an 802.11b link 80 and a Bluetooth link 90, but need not include either TCA 20 or ISD 30. Further, node 10 may include either an 802.11b link 80 or a Bluetooth link 90, in which case it may serve as a relay node in an 802.11b network or in a Bluetooth network, as the case may be.

TCA software module 20 may sometimes be referred to herein as a TCA node 20 or as a control node, and/or ISD software module 30 may sometimes be referred to herein as an ISD node 30 or as a sensor node.

Message distribution manager 50 manages command and control information and packaged data information exchanged with control TCA 20 and routing protocol core 60, and/or command and control information and data information exchanged with sensor ISD 30 and core 60. Message manager 50 packages data produced by ISD 30 and/or control TCA 20 so that, in conjunction with routing protocol core 60, communication is "event-based." Event-based communication generally refers to communication initiated in response to a certain event, e.g., a sensor detecting an event it is intended to detect, a node 10 having an out-of-limit condition, and/or a data request by a control node, such as a periodic status confirmation.

Event-based communication is desirable because it furthers one or more of the advantages of: low probability of detection of a node by others, low probability of interference between transmissions by the nodes, conservation of network resources (e.g., bandwidth), and/or conservation of power/energy (e.g., generally provided by a battery in a node 10).

Tactical Control Application (TCA)

A graphical interface, namely the TCA 20, provides high level control over common networking and sensor management operations. TCA 20 presents a main topology screen with relative GPS coordinates marked for altitudes and latitudes of the sensor nodes, e.g., as displayed on a laptop, portable or other computer. When a "Node Discovery" event is initiated, control packets flood the network and nodes hearing the packets introduce themselves to the TCA with their GPS coordinates. Nodes are placed on the topology screen with their reported coordinates, or if that is not available, with default coordinates retrieved from a stored file. "Detailed Hello" packets comprised of node interface details are also exchanged. Suitable interfaces include Bluetooth, 802.11b, various combinations of sensors, and the TCA application itself. Employing this information, the "Control Node" applies further directives to initialize nodes with default configurations read from a template file. Templates denote periodic update and alarm settings for the various sensors 30 and/or sensor nodes 10. Any further changes to node interfaces are automatically reported to the TCA and updated visually on the screen. A "Node List" screen, as the name implies, shows the complete list of nodes discovered, with their summary pertinent information. Selecting a particular node and clicking on the "Node Details" button opens a window with information specific to the selected node only. This screen allows the operator to request "Manual Updates" on sensor readings, and update alarm conditions.

TCA 20 contributes to network healing by trying to initialize nodes 10 that have not sent periodic updates for a specified amount of time. A problematic node is denoted, e.g., by a red cross on its icon, which disappears after communication has been reestablished.

TCA 20 implements retransmission in accordance with a Sensor Messaging Protocol (SMP). If SMP directives, consisting of set and get requests, are not acknowledged within a predetermined time, the requests are repeated. The number and time between repeat attempts are configurable (setable).

A socket is assigned to tap into the TCA 20, e.g., in terms of receiving and sending directives and events taking place on the network. Therefore, software components that monitor and manage the network may be added outside of the TCA GUI available to the user.

Multiple nodes 10, including, e.g., one or more ISD sensor nodes 10S and/or one or more TCA control nodes 10C, can coexist on a network and may enter and leave the network, and the operation of each is independent of the other nodes 10.

Intelligent Sensor Device (ISD) 30

The Intelligent Sensor Device (ISD) 30 is used to precondition and integrate low-rate field sensor data with the Ad-Hoc Wireless Sensor Network. ISD 30 and a network interface 50-90 are the two components of a sensor node 10. ISD 30 periodically collects sensor data for status reports and creates event alarms caused by predefined sensor out-of-limits conditions or state changes. The communication network in one implementation is Bluetooth, but the transport protocol used with the ISD 30 is network independent. In one implementation, ISD 30 is built as a stand-alone device to inter alia provide instant portability to various network platforms through a standard RS232 serial interface. The functions of ISD 30 can be ported to the embedded processor running a specific network protocol 60 stack.

The ISD 30 typically has the following attributes:
Provides an intelligent and flexible interface between low-rate data sensors and a network interface via a simple serial connection.
Creates sensor message packets for both alarm and status information.
Responds to SNMP-like 'set' or 'get' requests from a controlling node.
Sensor alarms are dynamically configurable:
Settings: Variable ID, threshold high, threshold low, alarm enable, alarm disable (also "all" enable/disable).
Alarms: Time tag, variable ID, value, out-of-limit high, out-of-limit low, return to nominal.
Alarm events are sent to the node(s) that enabled the alarm.
The most recent alarms are stored within the ISD for later query.
Periodic status reports are dynamically configurable:
Settings: Variable ID, report interval, activate, inactivate, (also global enable/disable).
Report: Time tag, variable ID, value.
Control node can get any variable and set any writeable variable in the ISD.
ISD protocol permits source/destination addressing of 64K logical nodes.
Built-in time-of-day clock (setable), optional GPS (built-in or external), and flexible hardware configuration to external sensors.
RFID (radio frequency identification) interrogator (optional, either internal or external).
ISD 30 is described in detail in the section below named "Network Interface for Low Data-Rate Sensors Using an Intelligent Sensor Device (ISD)".

Message Distribution Manager

Message Distribution Manager (MDM) 50 is the central entity responsible for routing messages between routing protocol core 60 and application layer entities 80, 90. MDM 50 provides a loopback mode that allows messages to be exchanged between a local TCA 20 and local ISD 30 without the need to send the packet to the routing Core 60 first. MDM 50 monitors all interfaces that become active on its node 10, then creates and transmits "Detailed Hello" packets containing the interface information. MDM 50 also sends "Simple Hello" packets and replies to "Poll" packets from other nodes 10. Finally, the MDM software includes hooks for allowing a web-cam (imager) to be connected to the 802.11b network.

Routing Protocol Core 60

Routing Protocol Core 60 (the Core) comprises protocols that provide routing capabilities to the network. It is based on the DAMAN routing protocol, but has been extended to support high levels of scalability, and low power consumption. DAMAN is described in published U.S. Patent Application 2003/0054767 entitled "Method and Apparatus for Using Wireless Network Enabled Devices Over Existing Wired Telephone Networks," which is hereby incorporated herein by reference in its entirety. Unlike original DAMAN that supports high mobility, the Core protocol 60 is preferably optimized for networks that are generally static. In other words, nodes 10 moving from place to place are typically handled as exceptions, and not as the regular case. Bridging between radios associated with nodes 10 is done through tables and metrics that denote which radio path is deemed optimum.

Core 60 is radio and operating system independent, as described in the section below titled "A Method and System Architecture for Implementing Radio-independent Routing Protocols for Multi-hop Wireless Ad Hoc Networks."

802.11 and Bluetooth Interface Wrappers 80, 90

An unusual aspect of conventional wireless routing protocols is their extreme dependency on the underlying radio technology employed. In this context, "radio" implies the Physical Layer and the Data Link Control Layer of the networking stack. This dependency is created by numerous features of the radio devices R-1, R-2, R-N that vary tremendously between any of the possible implementation platforms. Any of these features need to be handled separately and in harmony with the rest of the protocol stack 60, 62. However, the virtually unlimited number of combinations makes this task either impossible or impractical in a conventional wireless network.

As a result, a conventional protocol often ends up being largely modified each time it is ported to a new platform, for example, from ns-2 to 802.11 on Linux, and then to Bluetooth on an embedded processor. This is because every radio (hardware or simulated) R-1, R-2, R-N offers its own set of features and capabilities, and hence requires specialized interfaces to access them. Sometimes the modified versions do not even resemble each other, and become viewed as independent protocols. Along the way, multiple independently developed platforms lead to increased complexity and unnecessary waste of time from the repetition of many common tasks.

The architecture and methodology described herein separates the routing protocol from the specifics of radio features R-1, R-2, R-N and interfaces 82, 92. The result is a platform independent "Core" 60, and "Interface Wrappers" 82, 92 acting as drivers between the "Core" 60 and its potential radios 84, 94. The wrappers 82, 92 handle:
1. Link Breakage Feedback and Beacons
2. Packet Delay Jitters
3. Broadcast Transmissions
4. Address Resolution Protocol (ARP)

which are all radio-dependent features. Details thereon are given in the section hereof titled "A Method and System Architecture for Implementing Radio-independent Routing Protocols for Multi-hop Wireless Ad Hoc Networks."

Scatternet Manager 70

Connectionless radios possess the inherent capability of talking to any radio in their transmission range, thus, their topologies are simply imposed by signal strengths between send and receive antenna pairs. Connection-oriented radios, on the other hand, require some additional intelligence, such as an independent entity that focuses on creating links to a subset of the neighboring nodes. The resulting links on which the routing protocol can communicate constitute its topology.

An entity named "Scatternet Manager" 70 is used with Bluetooth. The Scatternet Manager 70 goes through inquiry/inquiry scan cycles to discover nearby Bluetooth devices (i.e.

neighboring nodes 10) and assigns them into piconet structures that eventually make up the connected scatternet. Core 60 uses scatternet links as its underlying topology. Details on the topic are given in the section hereof titled "A Method and System Architecture for Implementing Radio-independent Routing Protocols for Multi-hop Wireless Ad Hoc Networks."

802.11b and Bluetooth Adapters 84, 94

The present system supports any radio technology through interface wrappers 82, 92 and other methods as described. The selected example 802.11b and Bluetooth technologies are two popular wireless LAN and cable replacement standards. 802.11b offers greater flexibility and higher data rates, whereas Bluetooth has the advantage of low cost, small form factor, and low power consumption.

Messaging Format

Messages between modules are exchanged with the following format:

```
/* Packet structure used in interprocess communications */
struct Packet {
    int                  packetType;
    struct brp_base_header brph;
    int                  dataLength;
    char                 applicationLayerPDU[MAX_DATA_SIZE];
};
```

Packet type denotes whether the packet contains a new interface message, a link breakage feedback message, or just a regular data packet.

```
/* Packet types for interprocess communications */
enum {
    newInterface        = 1,
    newPacket           = 2,
    linkBreakageFeedback = 3
};
```

Interface information is contained in the type field of the brph structure. The possible interfaces are listed below:

```
/* Interfaces and applications */
enum {
    routingProtocolCore  = 1,
    moduleManager        = 2,
    the802_11bInterface  = 3,
    bluetoothInterface   = 4,
    scatternetManager    = 5,
    ISD                  = 6,
    TCA                  = 7
};
```

The dataLength field denotes the length of the application layer PDU.

Message Admission Control 56, 86, 96

Additionally, message admission control may be provided by message control 56 coupled between message distribution manager 40 and Core 60, and/or message control 86 coupled between interface wrapper 82 and radio adapter 84, and/or message control 96 coupled between interface wrapper 92 and radio adapter 94. While illustrated separately for purposes of description, any of message controls 56, 86, 96 could be implemented as part of any of the elements to which they are coupled, and the function(s) performed by any one message control may be provided by any other one or more other message controls. The features provided thereby are sometimes referred to in the context of "quality of service."

Message control 56, for example, may provide certain constraints upon the transmission of messages. Typically, message control 56 may provide certain policy-based constraints, such as adding a delay and/or jitter before the start of transmission, eliminating (or filtering) redundant data from one or more messages, providing for retransmission of certain messages (e.g., until acknowledged), assigning a transmission priority, and/or restricting transmission on security considerations. Message control 56 may also provide certain resource-based constraints. Message control may provide a constraint directly or may provide a constraint indirectly, e.g., as by "marking" or identifying a particular message as being subject to a constraint wherein the constraint is actually implemented elsewhere, e.g., in message control 86 and/or 96.

Message control 86, 96, for example, also may provide certain constraints upon the transmission of a message. Typically, message control 86, 96 may provide resource-based constraints, such as those related to bandwidth, hop or routing delay and/or jitter, transmission reliability, hop count and/or route length. In addition, message control 86, 96 may implement policy based constraints, including such constraints marked or identified with a message elsewhere, e.g., by message control 56. Typically, constraints such as delay/jitter, message priority, message retransmission and security are identified by message control 56 and are implemented by message control 86, 96. Typically, message control 86, 96 is more closely associated with the radio portion of the system, and so would know the characteristics of the communication resources, such as characteristics of the various links, hops, routings, and the level of message traffic being carried. Message control 86, 96, typically includes a buffer for storing messages that are retransmitted until receipt is acknowledged.

It is noted that any of the policy-based constraints and any of the resource-based constraints may be controlled and/or provided by any of message controls 56, 86, 96, whether as separate functions or integrated into other functions. Admission control and the various constraints are described further herein in relation to FIGS. 5B, 5C and 11B.

This arrangement described includes a modular system and software architecture, e.g., for utilizing almost any radio technology in an ad hoc network system, and for bridging data/information packets between the radios. This arrangement provides a GUI for managing, automating, and monitoring an ad hoc sensor network, and a way to couple a TCA and/or an ISD 30 to an ad hoc sensor network.

A Method and System Architecture for
Implementing Radio-Independent Routing Protocols
for Multi-Hop Wireless Ad Hoc Networks.

This section describes a unique technique and system architecture that enables the transfer of a routing protocol to various types of connection-oriented and connectionless radio technologies such as Bluetooth and 802.11. The routing protocol is separated from the specifics of radio features and interfaces. The result is a platform independent "Core" 60, and communication devices 80, 90, e.g., including "Interface Wrappers" 82, 92 acting as drivers between the."Core" 60 and various potential radio implementations 84, 94.

Radio-Independent System Architecture

Figure 2:
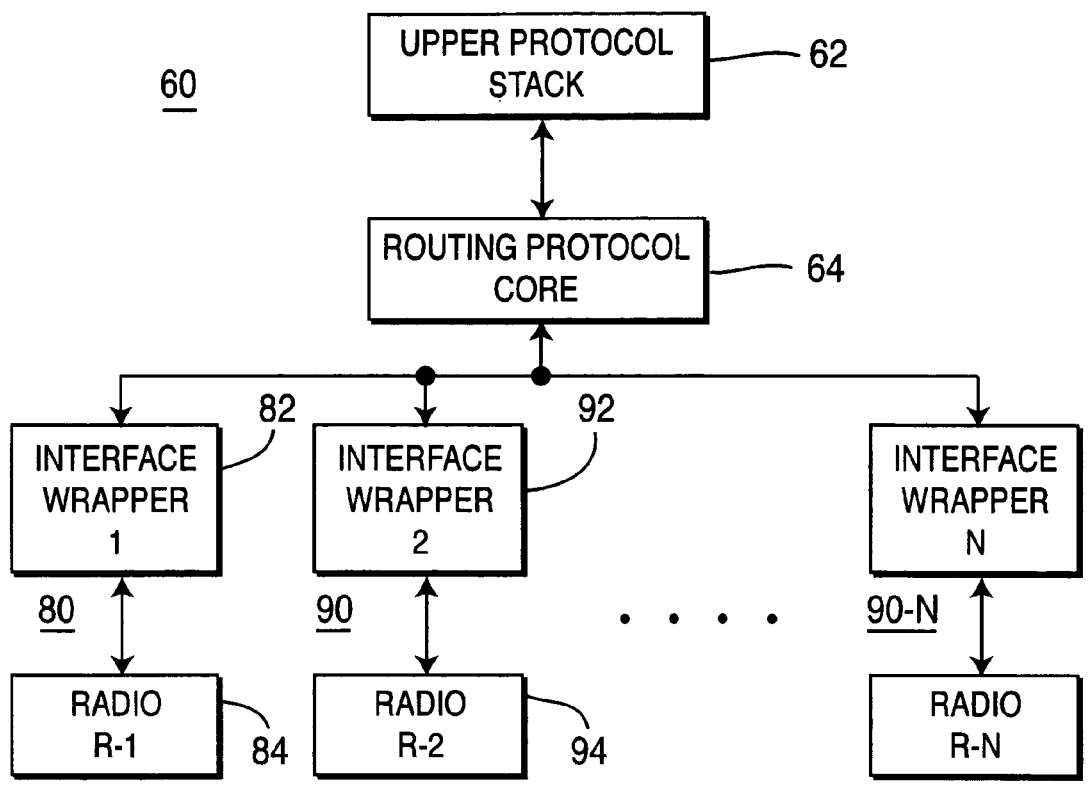
FIG. 2 is a schematic block diagram of an example embodiment of a radio-independent system architecture aspect of the embodiment of FIG. 1.

FIG. 2 illustrates the radio-independent modular system architecture that allows a routing protocol core 60 to be independent of any underlying radio technology. Core 60 includes an upper protocol stack 62 to interface with TCA 20 and/or ISD 30 and a main routing protocol core 64, and communicates with radios R-1, R-2, R-N which may employ different radio technologies via different interface wrappers 80, 90, 90-N.

The following radio-dependent protocol features are handled by interface wrappers:

Link Breakage Feedback (LBF) and Beacons:

Many routing protocols maintain routes by requiring each node 10 to transmit periodic beacon messages. If a node 10 does not hear one of its neighbors' beacon messages for an extended period of time, it may decide that the link with the corresponding node 10 is down and the topology has changed. Another method for detecting topological changes is to process Link Breakage Feedback messages generated when reliable Link Layer protocols fail to deliver their packets.

Example interface wrappers 80, 90 include adapters for 802.11 and Bluetooth based communications devices, respectively. Bluetooth realizes LBF through signals from its L2CAP layer, and, when a connection terminates, L2CAP returns an error message containing the pertinent details; this allows the route tables to be updated and if necessary the route discovery mechanisms to be invoked. When the 802.11 standard's reliable MAC transmissions fail, the hardware adapter may return a pointer to the failed packet included in a LBF message to the routing protocol core 60. Core 60 may then again decide an appropriate set of actions and also retransmit the failed packet if desired.

Packet Delay Jitters

To avoid packet transmission synchronization, and undesirable collisions, many routing protocols apply small jitter delays to packets that are received in broadcast mode and have to be further relayed. For link layers lacking broadcast capability, however, the danger of synchronization does not exist. Therefore, it is appropriate for interface wrappers 80, 90 to determine whether a jitter is required or not. An example protocol implementation for 802.11 uses uniformly distributed time-delay-jitters with maximum bounds of 10 ms. The process of drawing samples out of an uniform distribution is done within the core 60 and the sample value is included in a message transaction between it and the interface wrapper 90. Bluetooth, which is basically a connection-oriented system, currently lacks broadcast capability, hence calculated jitter values are ignored in the interface wrapper. In general, it could be stated that connectionless radios would require packet delay jitters and their connection-oriented counterparts would not.

Broadcast Transmissions

The route discovery mechanism (which is triggered by a change to the network topology, e.g., activation of a node 10 or loss (as by moving or failure) of an existing node 10), routine network maintenance traffic, and many other tasks routing protocol 60 undertakes, require use of link-layer broadcast transmissions of packets. However, not all radios offer broadcast capabilities and so interface wrappers 80, 90 handle such transmissions. 802.11 supports link-layer broadcasts; and this is accomplished by assigning a broadcast MAC address to the destination in Interface Wrapper 90. Bluetooth lacks broadcast capability and so, e.g., dynamic tables of all active Bluetooth connections of a node are maintained and broadcast-marked packets are sent on each of the connections. This approach may be applied to any communications platform that does not support broadcasts.

Address Resolution Protocol (ARP)

ARP is needed to make conversions from network to MAC addresses, which are typically independent of each other. Because the original ARP specification was designed for the Ethernet medium, and 802.11 is intended as an extension of wired LANs, it can be (and has been) easily applied to ad hoc networks operating on 802.11. Bluetooth, however, is much different, and original ARP rules do not apply. To circumvent this situation, IP/MAC address 30 pairs are included in the connection tables of wrapper 90 and are exchanged immediately after an L2CAP connection completes. For each transmission, Bluetooth Interface Wrapper 90 searches through its tables, looking for address matches, and then sends the packet on the appropriate connection. ARP data is continuously updated according to event updates and information flow from L2CAP.

Topology Establishment Module

Connectionless radios possess the inherent capability of talking to any radio in their transmission range, thus, network topologies are defined by signal strengths between send and receive antenna pairs. Connection-oriented radios, on the other hand, require some additional intelligence, or better an independent entity that focuses on creating links to a subset of the neighboring nodes. The resulting links on which the routing protocol can communicate constitute its topology. Scatternet Manager 70, provided for use with Bluetooth, goes through inquiry/inquiry scan cycles to discover nearby Bluetooth devices (i.e. neighboring nodes 10) and assigns them into piconet structures that eventually make up the connected scatternet. The Core 60 uses scatternet links as its underlying topology.

Topological Changes—Detecting New Neighbors

Detecting and reacting to topological changes is among the main responsibilities of ad hoc routing protocols. In general, if a packet from a previously unknown neighbor is received, the routing protocol core 60 updates its tables with the new neighbor information. Connection oriented communications technologies, such as Bluetooth, offer a shortcut to obtain the same result. During a topology establishment stage, Scatternet Manager 70 exchanges address information of nodes on the two ends of a link and passes it to Core 60. This method is quick and efficient in utilization of network resources. The technique and system architecture described above allows an effective separation of radio specifics from routing protocol mechanisms, thus enabling easy implementation and porting of protocols between various radio platforms.

Messaging Interfaces

Figure 3:
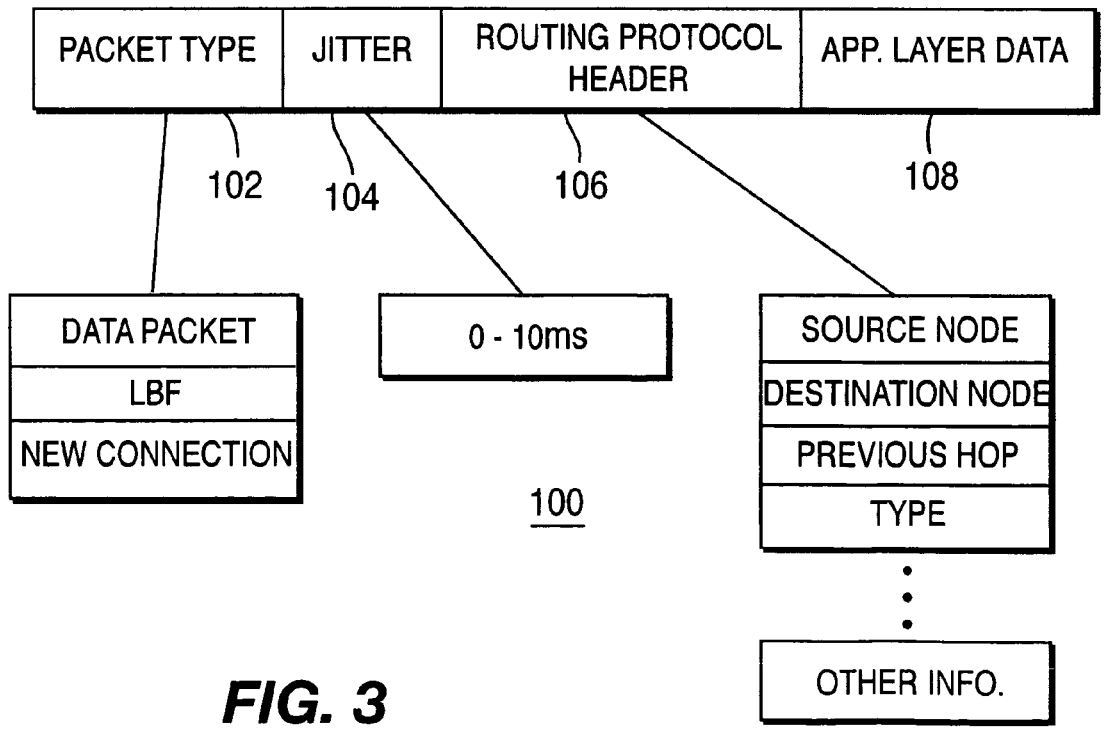
FIG. 3 is a schematic representation of an example messaging interface between a core and its interface wrappers.

FIG. 3 illustrates a messaging interface 100 between a Core 60 and its Interface Wrappers 80, 90. A LBF message to Core 60 can be denoted by setting the "Packet Type" field 102 accordingly, to distinguish from a packet of data and a new connection. "Jitter" is specified in jitter field 104 as a random variable distributed between 0 msec and 10 msec in the respective field. Interface Wrappers 80, 90 look at the "Routing Protocol Header" filed 106 for information regarding broadcast packets, and peer addresses used to execute ARP. New neighbors are noted by assigning a "Hello" message type field in the routing protocol header 106, which also designates source node, destination node, previous hop, type and the like. An application layer data field 108 follows. The arrangement provides a unique technique and system architecture that enables the transfer of a routing protocol to various types of connection-oriented and connectionless radio technologies, and also provides a messaging interface between system modules and may be implemented on top of Bluetooth, 802.11, and other protocols.

Network Interface for Low Data-Rate Sensors Using an Intelligent Sensor Device (ISD)

This section describes the hardware, software, and protocol design to precondition and integrate low-rate field sensor data with an Ad-Hoc Wireless Sensor Network. Specifically, this section describes an Intelligent Sensor Device (ISD) 30 used to precondition and integrate low-rate field sensor data with an Ad-Hoc Wireless Sensor Network.

ISD 30 and a network interface 50-90 are two components of a sensor node 10 described above. The data flow from the sensor through the network to a control node 10 running tactical control application software (TCA 20) is described first, followed by the Sensor Transport Protocol (STP) and a description of the ISD hardware platform and software architecture needed to implement the ISD 30. Next is a description of the network access point API, and examples of ISD data collection. An implemented MIB definition is included in the final section.

Sensor Data Flow

Figure 4:
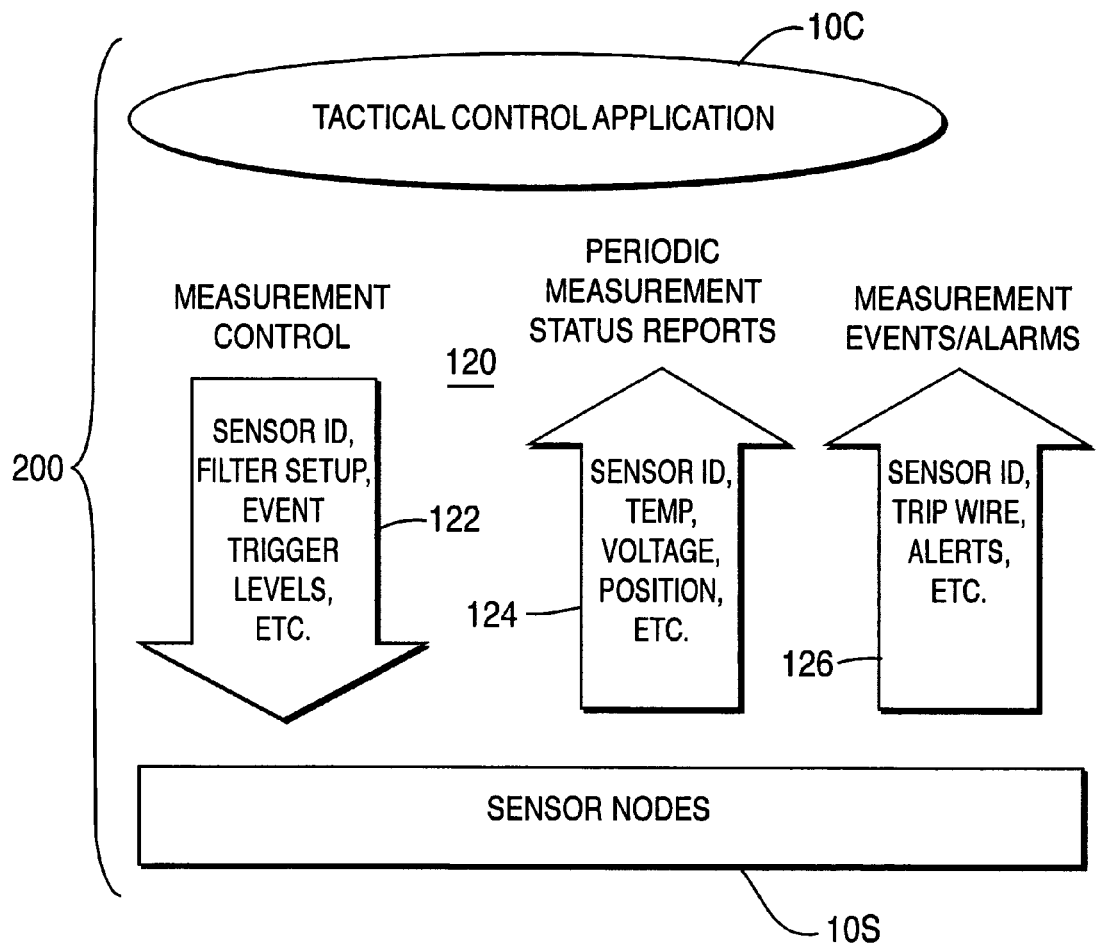
FIG. 4 is a schematic diagram illustrating an example flow of sensor and control data.

FIG. 4 illustrates examples of sensor and control data flow 120 between a TCA control node 10C and an ISD sensor node 10S. ISD 30 collects both internal status and external sensor information for a tactical software application running on a distant control node 10C. Internal information 124 includes sensor node identification, time of day, internal temperature, battery voltage, and other data. External information 126 includes field connectable sensors such as IR break-beam intrusion, seismic data, magnetic, passive IR, acoustic, and the like. This information is collected and reported to control node 10C at intervals determined by TCA 20. TCA 20 also sets measurement and control values 122, such as alarm trigger limits for each type of sensor attached to an ISD 30. Alarms events 126 (for both out of limit event and return to limit event) have priority over status reports 124.

Sensor Transport Protocol

The Sensor Transport Protocol (STP) is a light-weight transport protocol to encapsulate the sensor and control data transmitted to and from the TCA control node 10. It is designed to work with a low data-rate wireless network such as Bluetooth. E.g., a fixed-length data packet format of 16 bytes (128 bits) is selected to be compatible with a maximum data payload size of 17 bytes for packet type DM1 for Bluetooth (1 time slot, with CRC and FEC protection). Since the connection speed between the ISD node 10 and network node interface is 9600 baud, the effective data rate is about 7,680 bits/second. At that rate, the packet transmission time for a 128 bit packet is 16.6 msec. This translates to a maximum rate of 60 sensor measurements per second.

In a Bluetooth piconet, the maximum symmetric user data rate for packet type DM1 is 108.8 kbps. If this data rate is equally time sliced to support seven slave nodes, it yields a 15.5 kbps bi-directional data rate for each of the slave nodes in the piconet. However, allocating the transmission slots equally is not an optimal implementation when data collected from each node is forwarded to a second piconet through a scatternet relay, e.g., via a relay node and/or bridge node 10.

Figure 5A:
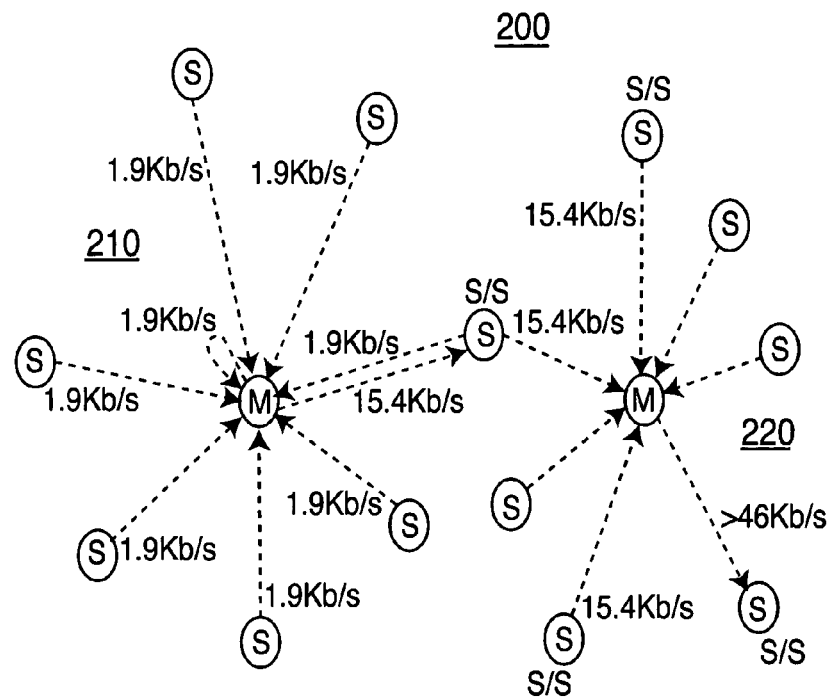
FIG. 5A is a schematic diagram illustrating an example embodiment of a scatternet/piconet arrangement.

FIG. 5A illustrates an example network 200 for a Bluetooth configuration where seven piconet slaves S of piconet 210 are sending measurement packets to a piconet master M, which in-turn adds its own measurement packets to the data collection. The master M then relays this collection of measurements to the piconet node S/S performing as a scatternet 200 bridge node to neighboring piconet 220. That final link to the Scatternet Bridge S/S has a maximum bandwidth of, e.g., approximately 15.4 kbps. This limits the maximum data rate to 15 sensor packets per second originating from each sensor node S of that piconet 210, 220. This scenario is illustrated by the following example scatternet/piconet 200 data rates:

For DM1 Piconets (108.8 Kb/s maximum) using seven slaves S equally at 15.54 Kb/s:

1.92 Kb/s=15 sensor readings per second from a sensor.

15.36 Kb/s= data rate from a collection of 8 sensors.

About 12% network loading for sensor nodes=about 100% loading for the Scatternet relay.

Note that the 15 kbps rate is exceeded when a second piconet has aggregate traffic from more than one piconet. An improvement in this model grants a sensor node S fewer time slots than those nodes S/S acting as scatternet relays. This type of load balancing is important when piconet data is aggregated. The maximum number of sensor readings per second supported by the network 200 is thereby limited by how the piconets 210, 220 and scatternets 200 are configured, and the maximum ISD node 10 serial link rate of, e.g., 60 packets per second.

Figure 5B:
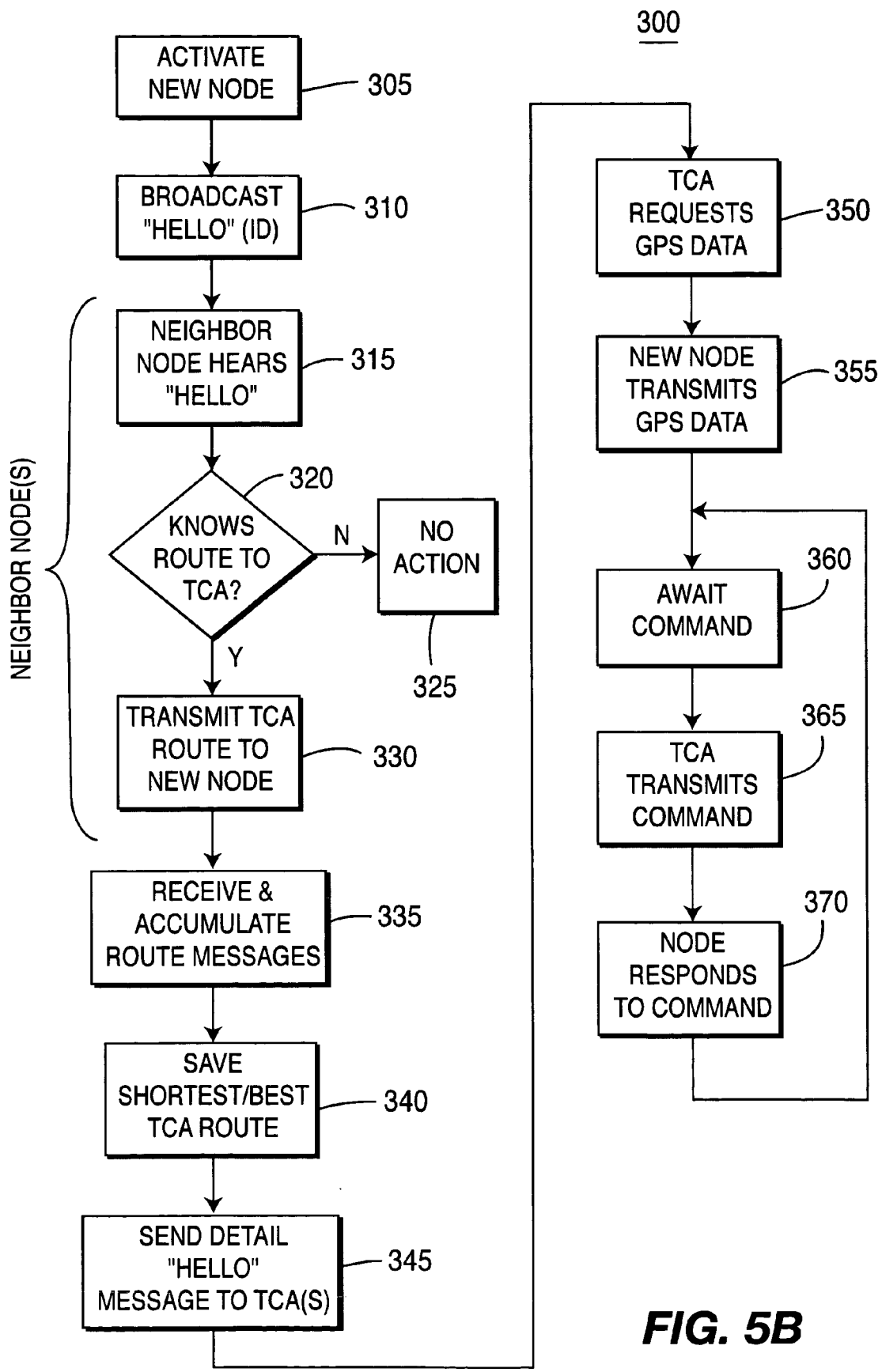
FIG. 5B is a schematic flow diagram illustrating the establishment of a scatternet/piconet.

FIG. 5B is a schematic flow diagram illustrating an example process 300 for establishing the scatternet/piconet 200 of FIG. 5A as nodes 10 including an ISD 30 (a sensor node 10S) and/or a TCA 20 (a TCA or control node 10C) are activated/deployed. For example, a new node 10, e.g., a self-contained apparatus including the elements of a sensor node 10S and/or a control node 10C, is activated 305, e.g., as by turning on or applying power thereto, so as to render it operational. Typically, deployment 305 of a node 10 might include activation and/or placing the node in a desired location. At activation 305, the node transmits 310 in the established communication protocol, e.g., Bluetooth, a "hello" message that at least identifies the node, e.g., by an internally stored identifier. Neighbor nodes, e.g., nodes previously deployed, if any, receive or "hear" 315 the hello message if within the transmission range of the signal transmitted 310 by the new node 10, i.e. if they are "in the neighborhood" of the newly deployed node. If a neighbor node hearing 315 the hello message knows 320 a network routing to a TCA control node 10C, if any, each neighbor node hearing 315 the hello message transmits 330 the TCA routing it knows 320 to the newly deployed node. If not, the neighbor node does nothing 325. Note that there is typically no urgency that would require the neighbor nodes to respond quickly, and so their transmission 330 of TCA routing(s) may not be made for a period of time, perhaps on the order of seconds or minutes.

The newly activated node 10 receives and accumulates 335 the TCA node routing(s) transmitted 330 by any neighbor node(s) and saves 340 the one or more TCA node routing(s) that are deemed optimum, e.g., TCA node routings that provide the shortest (e.g., fewest number of hops) and/or the best (e.g., direct or via bridging node to higher bandwidth links or via the fewest number of nodes) TCA route(s). The newly activated node 10 then transmits 345 a detailed hello message to the TCA node(s) 10C to which it has a route so that the TCA node can register the node and its characteristics, e.g., type(s) of sensors, internal condition and the like. If the new node 10 includes a GPS locator (optional), the TCA node transmits 350 a GPS request to the node 10 and the node 10 transmits 355 to the TCA node 10C its location as determined by its internal GPS locator. The node 10 then simply awaits 360 a command from a TCA node and/or an event detection by one or more of its sensors. Upon receipt of a command transmitted 365 to it by a TCA node 10C, the node 10 then responds to the command and transmits 370 the response, if required. It then resumes to await 360 another command or an event. TCA node commands can set or release sensor settings and operational conditions, activate and deactivate any sensor at the node, and/or obtain a singular report or periodic reports of node condition, as desired.

Activation of a newly deployed TCA control node 10C is likewise except that it identifies itself 310, 345 as a control node and stores 335 routes to other sensor nodes 10S, if any, as well as to other control nodes 10C, if any. It is noted that the establishing of a new node 10 joining the network (either an ISD node 10S or a TCA node 10C) may take seconds, many seconds or even minutes, which is ordinarily not a problem for many applications of the ad hoc wireless network 200. This relatively slow pace tends to further several advantages, e.g., conservation of node electrical power and of communication bandwidth, reduced probability of interference between transmissions, and/or reduced probability of detection.

Figure 6:
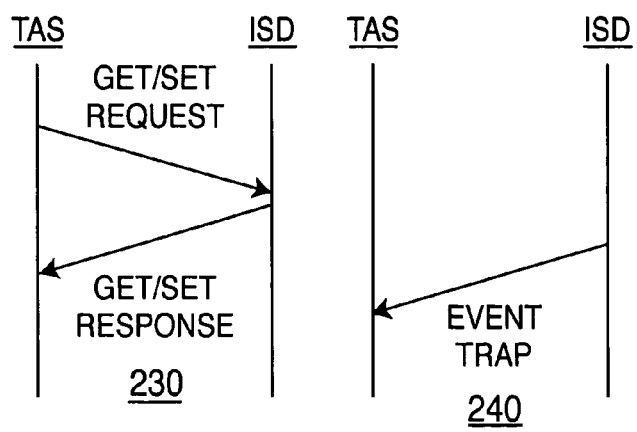
FIG. 6 is a schematic diagram illustrating examples of various network messages transmitted between a TAS and an ISD.

The ISD transport protocol has its roots in SNMP, but is simplified to be effective for transporting measurement data and control information between TCA nodes 10C and ISD nodes 10S. Communication of sensor information is under the management and control of TCA node 10C. TCA node 10C controls the data rate from each ISD node 10S by specifying 365 the need for periodic status measurements as well as the need for alarm events. In addition, TCA node 10C can request the current state of any ISD variable, or change the value of a variable in ISD node 10S. The specific variables that can be accessed by the TCA manager are defined in a Management Information Base (MIB) of which a sample is shown below in FIG. 15. The message packets use a simple request-reply protocol, where TCA node 10C sends a request and ISD node 10S sends a reply as indicated in the STP network messages 230 of FIG. 6. Also, once trap signals 240 are enabled, ISD node 10S can send asynchronous event packets to TCA node 10C. ISD node 10S must be instructed to send traps 240, which traps to send, and where to send them.

Assuming that some of the messages might get lost in a wireless network, the TCA manager preferably provides a timeout and retransmission scheme for each polling message sent. Note that trap events are sent asynchronously by ISD node 10S and do not rely on an acknowledgment to confirm delivery. Guaranteed delivery can be supplied at the network layer, if needed. Additionally, TCA node 10C can recover lost traps by periodically polling each ISD node 10S for trap status information.

Figure 5C:
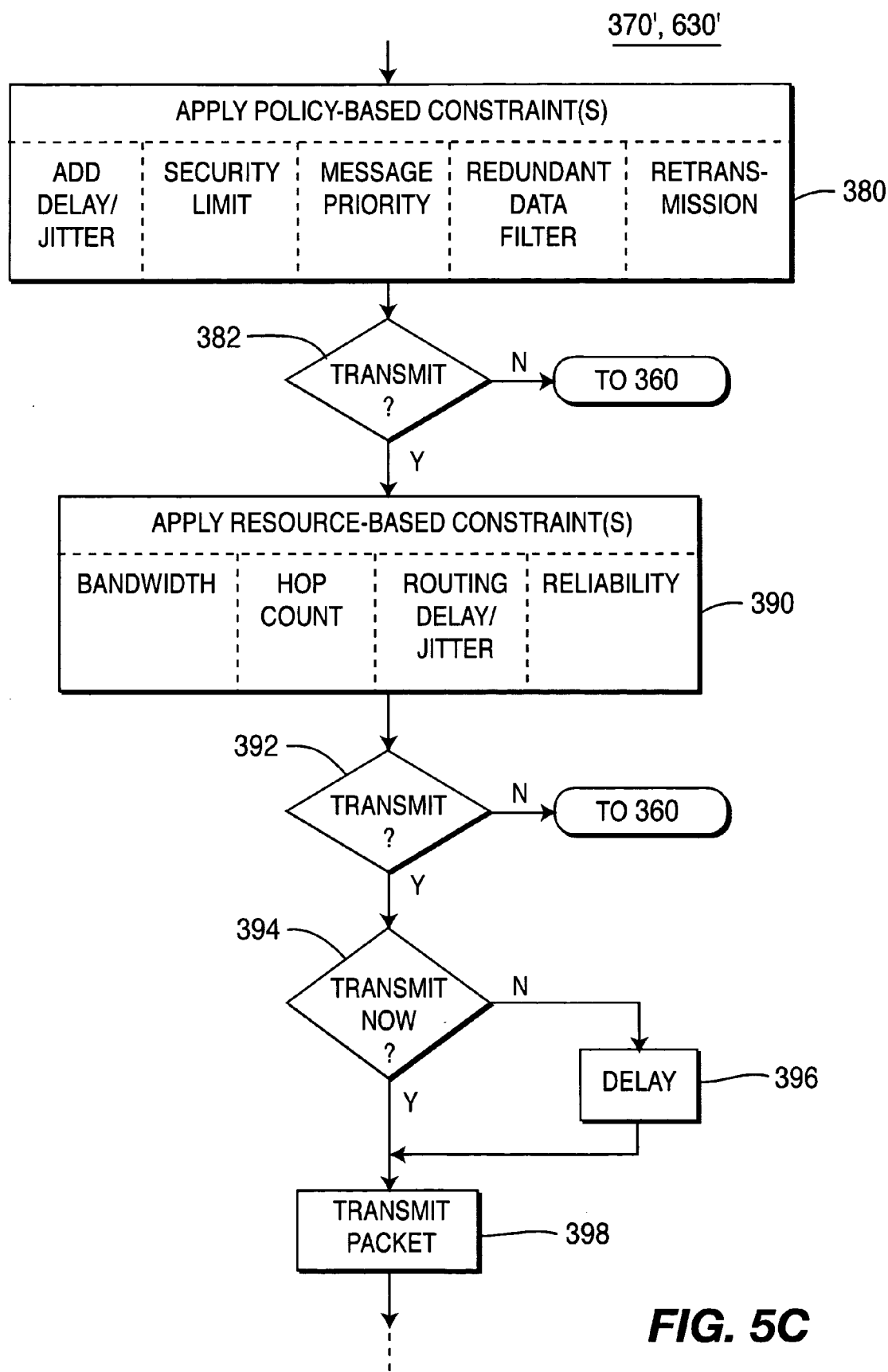
FIG. 5C is a schematic flow diagram illustrating an example transmission control protocol.

FIG. 5C is a schematic flow diagram illustrating details of an example transmission control protocol 370' governing transmission 370. "Admission control" of data packets that may be transmitted by various nodes of the network may be provided to select the transmission routing and priorities of such data packets, so that an acceptable level of quality of service is available even in time of high transmission activity. An example of a high activity condition making admission control desirable is a seismic event, such as an earthquake, or another event producing a seismic or other disturbance over a relatively wide area so as to be detected by plural nodes 10. Practical limitations of the nodes 10, such as computing power (e.g., a 25-45 MHz processor clocking rate), memory capacity (e.g., 50-100 kilobytes of RAM), and battery power, may also limit what may be transmitted and when.

Typically, quality of service relates to a set of requirements to be met by a network while transmitting a set of messages from their respective sources to their respective destinations. Typical measures (metrics) of quality of service include, for example, packet loss probability, available bandwidth, end-to-end delay, end-to-end jitter, and the like. Consistent with the desire to conserve battery power, an approach to quality of service that tends to reduce the overall network transmission traffic and to balance the power usage of the various nodes may be employed.

Simple approaches, such as designing the network to accommodate the peak transmission loads or to always route transmissions by the shortest transmission path, tend to be disadvantageous for cost and/or performance reasons. Other approaches, such as to reserve network capacity in advance or to assign priorities to various classes of messages, are helpful, but do not provide an overall satisfactory level of service for all or almost all conditions and messages. Accordingly, an admission control arrangement that operates based upon plural determining criteria is desirable, e.g., wherein certain admission constraints or criteria are policy based and others are resource based.

A policy-based constraint relies upon one or more pre-defined rules and not on the current condition of the network or of the transmissions thereon. Thus, a policy-based constraint has the same effect irrespective of the addition and/or removal of nodes and of the presence or absence of events producing transmissions over the network. Examples of policy-based constraints include, but are not limited to, guaranteed delivery (message retransmission until receipt acknowledged), delaying transmission of certain classes of data by a delay and/or a jittered delay, prohibiting use of a specific link and/or routing for security reasons, applying pre-assigned message priorities, prohibiting transmissions based upon a required minimum and/or maximum time interval between transmissions, discarding or not transmitting data deemed redundant, and the like.

A resource-based constraint is based on a knowledge of the availability of bandwidth and other network resources. Certain resource-based constraints are additive, such as transmission delay, transmission jitter, link utilization, cost and hop count, whereas others are multiplicative, such as link reliability, and still others are concave, such as bandwidth, where the value is determined by the link or node having the minimum available resource. In the context of the resource-based constraint, transmission delay and transmission jitter refer to the selection of a link, links and/or message routing that provides a level of delay and/or jitter that is suitable for the type of data contained in the message. For example, for voice messages, a delay of less than about 300 milliseconds is desired.

The example arrangement 370' described employs admission control based upon at least one policy-based constraint and at least one resource-based constraint, although any non-zero number of either type constraint may be utilized in a particular embodiment. Example policy-based constraints for service priority is as follows:

Periodic Sensor Update Message Class messages, which are messages by which control nodes request periodic updates from various sensor nodes, are transmitted on a best efforts, i.e. low priority, basis. In many networks, these messages are the most common type of message transmitted. Delays and packet losses are generally tolerable and bandwidth requirements are relatively minimal. There is no need for automatic re-transmission if packets are lost or if a link breaks.

Node and Service Discovery Protocol Class messages, which are necessary to the establishment of a network and to its maintenance, are transmitted at Priority Level 1. Priority Level 1 is characterized by end-to-end retransmission, routing packets via hops with the highest received signal strength indicator (RSSI) ratings, buffering of packets upon link breakage and priority queuing. These messages may take precedence over all other message types when network reliability is a concern. However, considerable delays and jitter are tolerable, and the use of network bandwidth is low because messages in this class are transmitted only a few times throughout the active operation of the nodes, e.g., at initial deployment and removal/failure of a node.

Sensor Messaging Protocol Traffic Class messages, which relate to request packets transmitted by control nodes 30, are transmitted at Priority Level 2. Priority Level 2 is characterized by TCA end-to-end retransmission, routing packets via hops with the highest RSSI ratings, buffering of packets upon link breakage and priority queuing. Where the TCA software provides for retransmission, a limited amount of packet loss may be tolerable.

Sensor Alarm Message Class messages, which indicate the occurrence of an event that may result in or trigger further or follow-up action being taken, are transmitted at Priority Level 3. Priority Level 3 is characterized by end-to-end retransmission, routing packets via hops with the highest RSSI ratings, buffering of packets upon link breakage, priority queuing and guaranteed levels of link bandwidth. Reliable delivery of these packets may be provided by preferential transmission scheduling and buffer queuing.

Still Image Stream Class messages, which include video and still images from video and other sensors triggered by various sensor alarms, are transmitted at Priority Level 4. Priority Level 4 is characterized by TCP retransmission on an 802.11b link, routing packets via hops with the highest RSSI ratings, buffering of packets upon link breakage and priority queuing. Typically, such video and image sensors capture and send images at low data rates. These packets require high data throughput, reliable packet transmission, and a reasonable level of delay and delay jitter.

Routing messages via the hops (neighboring nodes) having the highest RSSI rating deviates from "shortest-path" routing, e.g., "shortest" in terms of the lowest number of hops between the originating transmitting node and the ultimate receiving node. RSSI routing is a resource-based constraint utilized in conjunction with the policy-based priority routing constraint.

Messages that are buffered (stored) and retransmitted by the originating node until the receipt thereof is acknowledged by the intended recipient node may be referred to as guaranteed delivery. For example, the last four of the foregoing Class messages may be considered guaranteed delivery messages having different message priorities. Typically, alarm messages and TCA control messages are guaranteed delivery messages.

Typically, Still Image Stream Class messages should be given high priority so that data transmission can carry the real time data rate of the video sensor, however, Still Image Stream Class messages may be subject to admission control to allow timely and reliable transmission of Sensor Alarm Delivery Class messages. Similarly, sensor data may be aggregated or otherwise processed for efficiency in transmitting such data under a given protocol.

Alternatively, Still Image Stream Class messages may be transmitted without buffering and retransmission, and any lost images may simply be ignored, since the information in previous and subsequent images may be deemed sufficient. This would avoid the need for substantial buffer memory capacity for storing the images and the consumption of network bandwidth be their retransmission.

Typical metrics that may be utilized in differentiating between the foregoing priority traffic classes include:

Packet Delivery Ratio—The ratio of the number of packets received by a destination node application layer to the number of packets transmitted at a corresponding source node application layer. It is an indicator of reliability, e.g., of lost packets.

Mean Packet Delay—The mean of packet delay. Packet delay is the time difference between when a packet is first transmitted at a source node application layer and when the same packet is received at the destination node application layer.

Mean Packet Jitter—Variance in the packet delay.

Average Route Length—The mean value of the number of hops (e.g., node-to-node links) from the source node that it takes for each packet to reach its final destination node.

Offered Load—The sum of the lengths of the packets transmitted from source nodes normalized by the duration of a time period, typically expresses in bytes per second.

Throughput or Bandwidth—The sum of the lengths of the packets received at destination nodes normalized by the duration of a time period, typically expressed in bytes per second.

In FIG. 5C, protocol 370' comprises, in addition to responding to the command transmitted 365 by TCA node 10C, applying 380 the policy-based constraint and determining 382 whether to transmit the data packet. If not, process 370' returns to await state 360. Typical policy-based constraints 380 include, e.g., introducing pseudo-random delay and/or jitter (to reduce collisions of messages responding to events detected at plural nodes), security limitations, applying message priorities, removing (filtering) data deemed redundant, and retransmission of guaranteed delivery messages.

If yes, the resource-based constraint is applied 390 and determines 392 whether the data packet is to be transmitted. If the data is not to be transmitted, process 370' returns to await state 360. Typical resource-based constraints 390 include, e.g., bandwidth, hop count (shortest path), link/route selection according to delay/jitter requirements for the data, and transmission reliability.

If the data packet is to be transmitted now 394, e.g., substantially in real time, then the data packet is transmitted 398. If not, the data packet is delayed 396 according to an appropriate time or priority or other criteria, and is then transmitted 398. It is noted that the order of the steps 380-396 are not important, e.g., the resource-based constraint may be applied 390 prior to applying 380 the policy-based constraint, and the decision elements 382, 392, 394 may be combined and/or applied in a different order.

To the end of each node 10 applying the appropriate policy-based and resource-based constraints, node 10 determines its distance (e.g., number of hops) from the control node 10C, allocates a fixed bandwidth based upon the maximal degree of the network and the distance, and determines the number of its current neighbors, e.g., at the time it joins the network and updates the number during network operation. In addition, information about the local network topology, e.g., such as the foregoing, may "piggy back" on protocol data packets transmitted during the network joining process and/or during network operations. The fixed bandwidth is allocated for the best effort priority level and is greater than or equal to the bandwidth allocated for guaranteed delivery messages. Each node may monitor the data transmissions of its neighboring nodes 10 for determining whether to increase or decrease the bandwidth allocation for best efforts messages.

The overall structure of the example STP format 400 is shown in FIG. 7. Descriptions for each field in this protocol are found in the paragraphs below. Note that the sixteen-byte packets 410, 450 are fully compatible with one Bluetooth time-slot when using "DM1", medium data rate with CRC and FEC protection.

Packet Sync

The Sync field (S) 412, 452 is composed of 6 bytes of 0×FF value and precedes the transmission of each STP 16 byte packet 410, 450. Sync field 412, 452 is used for packet synchronization and is not used beyond the RS232 serial interface to the network host. The value of the Sync word will not appear in the 16 byte payload data.

Bytes 0 . . . 3

The 16-bit source ID 414, 454 and destination ID 416, 456 identification fields contain the logical device identification between the initiator and target of the packet data. Of the 65535 device IDs, ID 0 is used by ISD 10S to identify the network host interface, IDs 1 . . . 100 are reserved to identify control nodes 10C, and the remainder (up to 0×FFFF) can be used for ISD 10S identification, however, ID 0×FFFF is not used to avoid interference with the Sync field.

Byte 4

There are only four types of messages that are exchanged between a TCA node 10C manager and a sensor node 10S. These are defined in the two-bit PDU Type field in byte #4 (item 418) of the STP format 400, and are described in Table 1.

TABLE 1

PDU Types

| Type | Name | Direction | Description |
| --- | --- | --- | --- |
| 0 | get_request | TCA to ISD | Fetch the value of a specified variable. |
| 1 | set_request | TCA to ISD | Set the value of a specified variable. |
| 2 | get/set_response | ISD to TCA | Return the value of the get_request message, and the completion status of the get_ or set_request. |
| 3 | event_trap | ISD to TCA | Time stamped event with event data. |

For packet type 2 (get/set response) 410, the 6-bit error code field 418 is used to indicate the success or failure of the get_request or set_request. These codes are defined in Table 2.

TABLE 2

Error Codes

| Error | Name | Description |
| --- | --- | --- |
| 0 | NoError | Get/Set request processed without error. |
| 1 | reserved | |
| 2 | noSuchName | Get/Set operation specified for a nonexistent variable. |
| 3 | badValue | Get/Set operation specified an invalid value or syntax. |
| 4 | ReadOnly | Set operation specified a read-only variable |
| 5 | GenErr | Other error. |
| 6 . . . 62 | reserved | |
| 63 | Not permitted | |

Byte 5

Byte 5 is called the Data Request Byte 420. Byte 420 is set to zero and unused in set_request packets 410. For get_request packets 410, a specific "get" is defined in byte 5 and it us used to specify either:
 a) Direct read access to a specified MIB variable, or
 b) Repetitive data status report for a particular MIB variable, or
 c) A trap event alarm issued when a particular MIB exceeds a specified threshold.

The most significant three bits of the Data Request Byte #5 indicate which method is being requested. Table 3 below describes the format of this byte.

TABLE 3

Data Request Byte #5

| b7 | b6 | b5 | Meaning | b4, b3, b2, b2, b0 |
| --- | --- | --- | --- | --- |
| 0 | 0 | 0 | Non-cyclic, non-alarm data request | Index byte offset from MIB start address (0 . . . 31) |
| 0 | 0 | 1 | Clear all previously cyclic status reports for all control nodes | (unassigned) |
| 0 | 1 | 0 | Set cyclic status reports for this control node | Cycle time in 15 sec units (1 . . . 31) (0.25 . . . 7.75 min) |
| 0 | 1 | 1 | Clear all status reports requests for this control node | (unassigned) |
| 1 | 0 | 0 | (unassigned) | (unassigned) |
| 1 | 0 | 1 | Clear all previous alarm data requests for all control nodes | (unassigned) |
| 1 | 1 | 0 | Set alarm data request for this control node | (unassigned) |
| 1 | 1 | 1 | Clear all alarm data requests for this control node | (unassigned) |

Alarms and status reports can be set individually for each control node 10C. They are cleared by a control node 10C in groups—clearing all requests for one control node 10C or all requests for all control nodes 10C.

For a direct read access request, the requested MIB and variable size are specified in byte #10 (item 424), and optionally a byte offset from this MIB address is specified in the lower 5 bits of the Data Request Byte 420. The specified data value is returned in the get_response message.

When the Data Request Byte 420 indicates a cyclic data request, the lower 5 bits of the Data Request Byte 420 indicate the time interval for reporting this variable as a trap event for a status report. Typically, the time interval is specified in 15 second resolution, but it could be defined to a logarithmic time scale or other time scale. Separate tables of cyclic data requests are kept for each control node. Cyclic data is limited to one trap message (e.g., 4 bytes), and the MIB address is explicitly specified in byte #10 without offset information from byte #5. The get_response message to a cyclic data request indicates if the ISD has accepted the command.

When the Data Request Byte 420 indicates a trap event request, byte #10 (item 424) contains the MIB address and size (as typical), and two other data elements are specified in the variable value byte 430:
 a) Alarm Condition, defined in byte 11, and
 b) The Alarm Threshold value, defined in bytes 12 through 15.

The Alarm Condition specifies the event triggers for an alarm message to be sent, and the definition of byte 11 of field 430 is shown in Table 4. The number of bytes used in the Threshold value, and their relative byte positions are dependent upon the variable size, as defined below in Table 5.

TABLE 4

Alarm Conditions

| b7 | b6 | b5 | b4 | b3 | b2 | b1 | b0 | Description |
|----|----|----|----|----|----|----|----|-------------|
| x | x | x | x | 0 | 0 | 0 | 0 | reserved |
| x | x | x | x | x | x | x | 1 | Out of limit High |
| x | x | x | x | x | x | 1 | x | Out of limit Low |
| x | x | x | x | 1 | x | x | Return to within limits |
| r | r | r | r | 1 | x | x | x | Repeating alarm (r = rep rate units of 15 sec.) |

Bytes 6 . . . 9

Each message 410 has a message request sequence ID 422, which is simply a four-byte incrementing integer value. The message ID of a get/set_response matches the message ID of a get_request or of a set_request. The ID values range from 0x0000 to 0xFFFF, wrap to 0 and repeat.

Byte 10

Byte #10 (item 424, 464) contains the MIB identifier ID and its size. The MIB, (an SNMP name for Management Information Base), is a database of variables, each with a preassigned variable number. To reduce the embedded system memory requirements, the sizes of the variables are not stored in the ISD, but rather they are specified with the MIB identified in byte #10. The two most significant bits of this byte are used for size, and the six least significant bits are used for the MIB ID. To enhance usability, the MIB ID can be offset by a specified number of bytes (refer to byte #5) when a simple get_request is used to read a MIB variable.

Bytes 11-15

MIB data for I/O is stored in packet bytes #11 through #15 of variable value field 430 of packet 410. The two bit variable size definition, and the data field storage assignments for all get/request packets are shown in Table 5. Trap packets 450 use, e.g., at most 4-byte variables for trap value 470, and their data field starts in byte #12 instead of byte #11.

TABLE 5

Variable Size

| Variable size | Meaning |
|---------------|---------|
| 0 | 1 Byte data field (byte #11) |
| 1 | 2 Byte data field (#11, #12) |
| 2 | 4 Byte data field (#11, #12, #13, #14) |
| 3 | 5 Byte data field (#11, #12, #13, #14, #15) |

If ISD 10S detects an event or problem, it sends a notification of the event to one or more TCA 10C controllers to alert the TCA to take appropriate action. TCA 10C enables ISD 10S to send trap messages 420, and indicates which available events and thresholds will trigger a trap event. The trap configuration is established with the appropriate set_request commands. An ISD 10S which is no longer functional cannot send a trap event to indicate it is down, therefore TCA 10C preferably polls each ISD 10S periodically to find its status and determine if any trap information 420 was sent, but not received (assuming the network protocols are not arranged to guarantee end-to-end delivery).

Trap Packets 450

Trap packets 450 have a different format definition for bytes 4 through 9 (items 458, 460) and byte 11 (item 466), as described below:

Trap Byte 4

If the most significant two bits of the packet type byte 458 indicate a trap packet 450, the balance of byte #4 indicates the trap identification as defined by Table 6.

TABLE 6

Trap Identification

| Code | Name | Meaning |
|------|------|---------|
| 0 | Ready for data transfer | Sent from ISD to network host interface to indicate the ISD is available. |
| 1-5 | reserved | |
| 6 | Node Trouble Report | Internal Sensor Node status |
| 7, 8 | reserved | |
| 9 | Config Trouble Report | Sensor Configuration status |
| 10 | reserved | |
| 11 | Sensor Alarm | Individual Sensor Report |
| 12 | reserved | |
| 13 . . . 62 | reserved | Group Alarm Reports, Status Reports, Statistics Report, etc. |
| 63 | Not permitted | |

Trap Bytes 5 . . . 9

Trap bytes 5-9 provide a five-byte time stamp 460 indicating when the trap event occurred. The format of this time stamp 460 is shown in Table 7. The TCA 10C can reset the clock value using the proper set_request commands, and the clock value is initially set by GPS time, if available.

TABLE 7

Time Stamp Format

| Byte # | Name | Range |
|--------|------|-------|
| 5 | Month | 1-12 |
| 6 | Date | 1-31 |
| 7 | Hour | 0-23 |
| 8 | Minutes | 0-59 |
| 9 | Seconds | 0-59 |

Trap Byte 11

Trap packet 420 alarm count 466 byte #11 is composed of two parts. The least significant five bits are used for an alarm event counter. The event counter increments by one for each alarm trap event sent to a particular control node 10C, however, the counter is not used for status report traps. The most significant three bits of byte #11 indicate the event token, as show in Table 8.

TABLE 8

Trap Condition Token

| Token | Name | Meaning |
|-------|------|---------|
| 0 | Generic event | Status Report Trap |
| 1 | Out of limit High | Alarm Trap |
| 2 | Out of limit Low | Alarm Trap |
| 3 | Return to within limits | Alarm Trap |
| 4 . . . 7 | reserved | |

ISD Hardware Platform

ISD 30 is a simple, low-cost, and programmable device sufficient to collect measurement data, encode this data into transport packets and transport the packets over a UART interface to a network port (such as Bluetooth). ISD 30 also receives and processes control packets 410 based upon the same transport protocol over the same network port. A commercial product, e.g., the Parallax Stamp type BS2p24 processor available from Parallax Inc. located in Rocklin, Calif., may be used as the CPU component of ISD 30. The characteristics thereof are shown in Table 9.

TABLE 9

ISD Microcontroller Specifications

| BS2p24 Characteristics | BS2p24 Characteristics |
|---|---|
| 20 MHz processor | 4,000 max lines of code |
| 2 Kbytes internal EPROM | 32 Byte internal RAM + 128 Byte scratchpad |
| 16 TTL-level I/O pins + 1 dedicated UART | 30 mA Source/Sink Current |
| 40 mA (60 uA sleep) Current Requirements at 5 v | 24-pin standard DIP Package |
| Supports I²C | Low Cost. |

Four peripheral components assist the BS2p24 CPU with data collection:

1. A real-time clock (e.g., Philips type PCF8583P available from Philips Semiconductors located in Eindhoven, The Netherlands) time stamps the sensor data and provides 240 bytes of RAM for storing application tables.
2. Up to three 256 Byte RAM devices (e.g., Philips type PCF8570 also available from Philips Semiconductors) stores application control tables.
3. A peripheral monitor (e.g., Dallas type DS1780 available from Dallas Semiconductor Corporation, located in Dallas, Tex.) measures internal ISD voltage and temperature and assists reading external sensor data.
4. A Global Positioning System (GPS) receiver (e.g., the M12 GPS board/module available from Synergy Systems LLC located in San Diego, Calif., which is based on the Motorola M12 receiver) provides both a time base and position locator. GPS is not required for ISD 10S operation, as the ISD clock can be set via commands from a control node 10C, and position information may not be needed at each sensor node 10S.

Typical specifications for the real-time clock and RAM are shown in Table 10, for the peripheral monitor in Table 11, and for the GPS receiver in Table 12.

TABLE 10

RTC and RAM Specifications

| Philips PCF8583P RTC/RAM | Philips PCF8570 RAM |
|---|---|
| I²C Bus (2-wire) compatible | I²C Bus (2-wire) compatible |
| 240 Bytes static CMOS RAM | 256 Bytes static CMOS RAM |
| 8-pin DIP package | 8-pin DIP package |
| Time of day storage | |
| On-chip 32.768 oscillator | |

TABLE 11

Peripheral Monitor Specifications
Dallas DS1780

I²C Bus (2-wire) compatible
Internal 9-bit digital thermometer
Six 8-bit ADC channels for monitoring voltages
Two tachometer inputs, One 8-bit DAC for motor control TABLE 11-continued Peripheral Monitor Specifications
Dallas DS1780

Maskable interrupts for temperature, voltage, intrusion detect
No external components
250 ua standby current                    24-pin TSSOP package

TABLE 12

GPS Specifications
Synergy Systems M12 GPS Board

Parallel 12 satellite channel receiver
Small size (40 × 60 × 10 mm)          Low Power (224 mw @ 3 v)
Based on Motorola M12 Oncore device
Outputs: NMEA 0183; Motorola binary, RS232 levels
Inputs: Optional TRCM Differential Corrections (RTCM SC-104)

Accessing I²C devices on a common I²C bus requires knowing their group addresses. Each device has a hard coded device address that is concatenated with its programmable address forming what is referred to as a "group1+group2" address. The number of bits in the programmable address (A2, A1, A0) may also be restricted by the bit addresses that appear on the device pins. FIG. 8 shows the group1 and group2 addresses for typical I²C devices used in ISD 10S. The setable bits in the group address have been configured in a manner that produces the I²C address map shown in FIG. 9.

Figure 10:
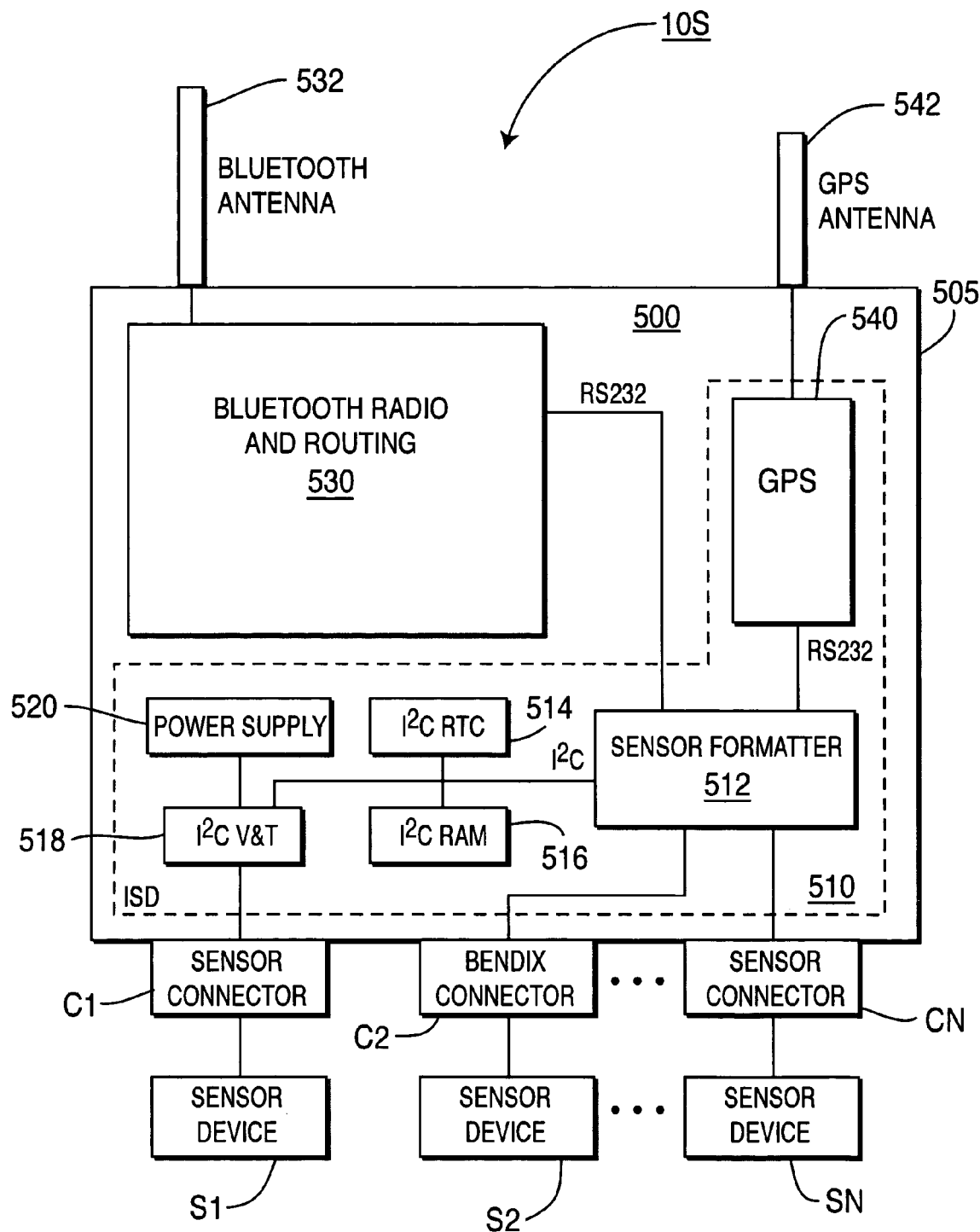
FIG. 10 is a schematic diagram of an example hardware arrangement of an embodiment of an ISD node.

FIG. 10 is a schematic diagram of an example hardware arrangement for a sensor node 10S. Sensor node 10S typically includes a sensor unit 500 housed in a closed chassis, housing or container 505. Unit 500 includes an ISD 30 device 510, a power source 520, a radio device 530 and various sensors internal to container 500, and may include one or more antenna and/or sensors external to container 500. Radio module 530 performs the software modules illustrated in FIG. 1, except for TCA 20 and ISD 30 modules. Container 505 typically includes various connectors C1, C2, . . . CN to provide connections to external sensor devices S1, S2, . . . SN, such as, e.g., a trip wire, acoustic detector, vibration detector, IR detector, imager, and the like.

ISD device 510 includes, e.g., a sensor formatter 512, RTC 514, RAM 516, and voltage and temperature (V&T) sensor 518, coupled via an I²C bus, that perform functions associated with message distribution manager 50 and core 60, and may also perform the functions associated with scatternet manager 70 and interface wrapper 90. ISD device 510 may also include external connections (not explicitly shown) supporting UART links to the network interface 530 and optional GPS sensor 540, e.g., via an RS232 bus. Preferably, the network interface (e.g., Bluetooth radio 530 (e.g., a type RC2000 or a type TC2001PE available from Zeevo Inc., located in Santa Clara, Calif.) and antenna 532) and the ISD device 510 are in the same chassis, housing or container 505, along with the addition of an external antenna 532 for communicating with the wireless network, e.g., the scatternet/piconet 200, and an optional GPS antenna 542. Power supply 520 may be a battery 520 (e.g., a 9-volt battery), fuel cell, or other suitable power source.

ISD Software Architecture

The Parallax BS2p24 sensor formatter 512 has a small internal memory map and uses 16 Kbytes of EPROM (in eight 2 Kbyte blocks or segments) for program storage, 26 bytes register RAM, and a 128 byte scratchpad RAM with slower access. External I²C RAM components 514, 516 store the control tables needed for operation.

In a minimal software implementation, the ISD software does not require an operating system (OS) to implement its primary functions. While the inclusion of an OS would make implementation easier, it is not a requirement for operability. As implemented in the Parallax Stamp CPU 512, the ISD software uses a cyclic loop, which contains five components:

a) Period of non-active (low power mode) waiting.
 b) Scan to receive any new packets via RS232 from the network adapter.
 c) Sensor data collection.
 d) Alarm generation period.
 e) Status report generation.

Figure 11A:
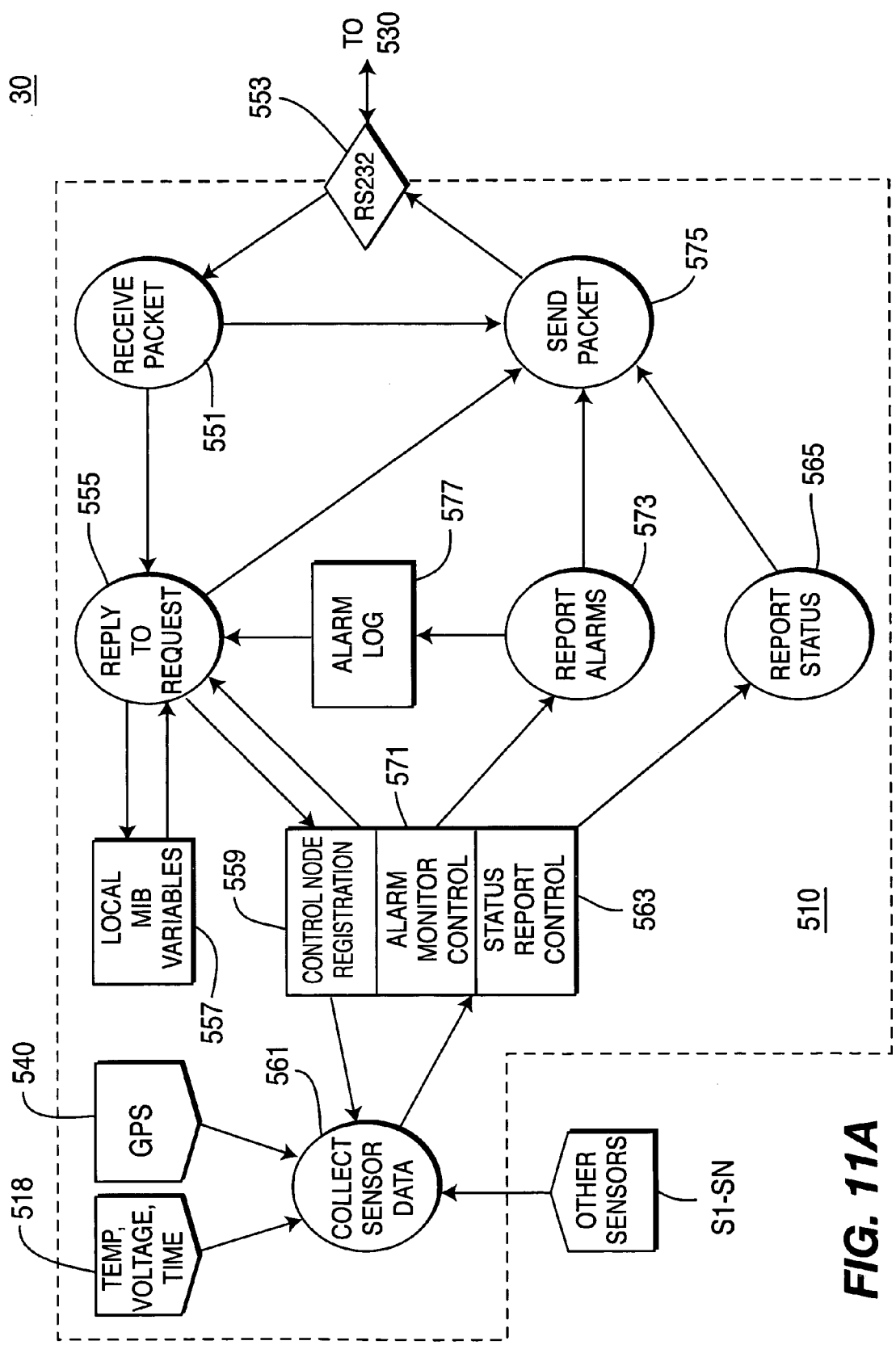
FIG. 11A is a schematic block diagram illustrating the function and data stores for an example embodiment of an ISD node.
Figure 11B:
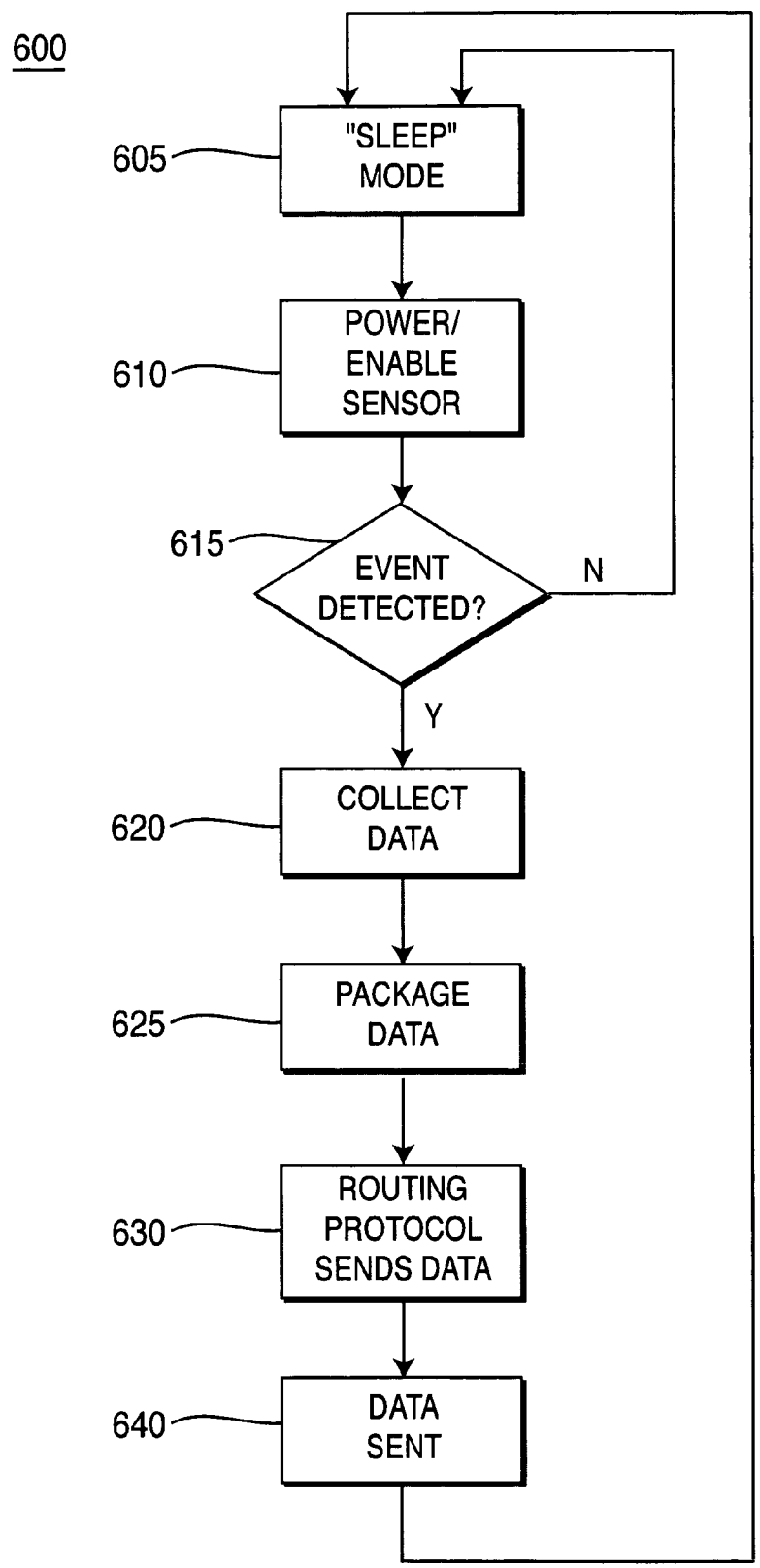
FIG. 11B is a schematic flow diagram for certain operation of an example ISD node.

FIG. 11A illustrates the ISD module 30 software function and data stores, and data flows between these components and their supporting functions and data stores. FIG. 11B is a schematic flow diagram illustrating an example operation 600 of an ISD sensor node 10S after its deployment and activation. These are described in relation to FIGS. 11A-11B, and FIGS. 12-15.

Preferably, the ISD nodes 10S operate in manner that conserves power and communication bandwidth. e.g., an ISD 30 causes node 10S to transmit 575, 630 only when an event that it has been commanded to monitor 571 has been sensed or detected 561, 615, and when data requested by a control node 10C is ready to be transmitted 575, 630 to the control node 10C. To that end, the ISD 30 node 10S typically operates 600 in a semi-dormant or "sleep" mode 605 in which only essential functions are powered and no data transmission occurs for a portion of the time.

In sleep mode 605, the sensor(s) 518, 540, S1-SN associated with ISD 30 of node 10S may be powered (i.e. "ON") continuously or may by turned "ON" or enabled 610 from time-to-time, e.g., periodically, for either regular or irregular intervals. In that case, the sensor(s) 518, 540, S1-SN is/are powered and/or enabled 610 from time to time for detecting 615 an event, if present. If an event is not detected 561, 615, ISD 30 and node 10S return to sleep mode 605. If an event is detected 561, 615, qualitative and/or qualitative data relating to the event is collected 561, 620 (e.g., type of event, magnitude, duration, sensor outputs/readings, date and time, and the like). The collected 561, 620 data is reported 573 and is logged 577, and also is packaged 625 and sent 575, 640 to a TCA control node 10C in accordance with the routing protocol. The rate at which a sensor 518, 540, S1-SN may be activated 610 depends upon the event that is desired to be detected. For example, a "trip-wire" or "beam breaker" type sensor intended to detect passing personnel may be activated 610 several times per second, while an acoustic or seismic or vibration detector intended to detect passing vehicles may be activated 610 less frequently. Further, a sensor 518, 540, S1-SN maybe activated 610 more frequently and/or continuously following detection 615 of an event so as to gather additional data on the event as it continues. Further, data produced by certain sensors S1-SN, e.g., a seismic detector, may be delayed 380 by a fixed time (delay) or by different fixed times (delay/jitter) so that detection of the same event by plural sensors and/or sensor nodes does not produce a large number of data packets to be transmitted at about the same time.

Absent a command 551, 555, 557, or continued monitoring 561, 571, of the event, the ISD 30 node 10S then returns to sleep mode 605 until the next time for monitoring 571 the sensor(s). One or more ISD 30 of a sensor node 10S may include one or more sensors 518, 540, S1-SN each. For example, an ISD 30 including a trip-wire or beam breaker type sensor may also include a camera or imaging sensor that is activated by the detection 561, 615 of an event by the trip wire or beam breaker. In another example, an ISD 30 of a node 10S including a trip-wire or beam breaker type sensor may activate a camera or imaging sensor associated with a neighboring ISD node 10S in response to the detection 561, 615 of an event by the trip wire or beam breaker.

In addition, the sending 630 of data may be subject to admission control including policy-based constraints and resource-based constraints similarly to that described above in relation to FIGS. 1, 5B and 5C, as indicated by the designation 630' in FIG. 5C. The label "To 360" therein is considered "To 605" in the present context.

This manner of operation tends to lead to several advantages which may include, e.g., conservation of node electrical power, conservation of communication bandwidth and network resources, prioritization of messages, reduction of redundant messages, reduced probability of interference between transmissions, and/or reduced probability of detection.

Figure 12:
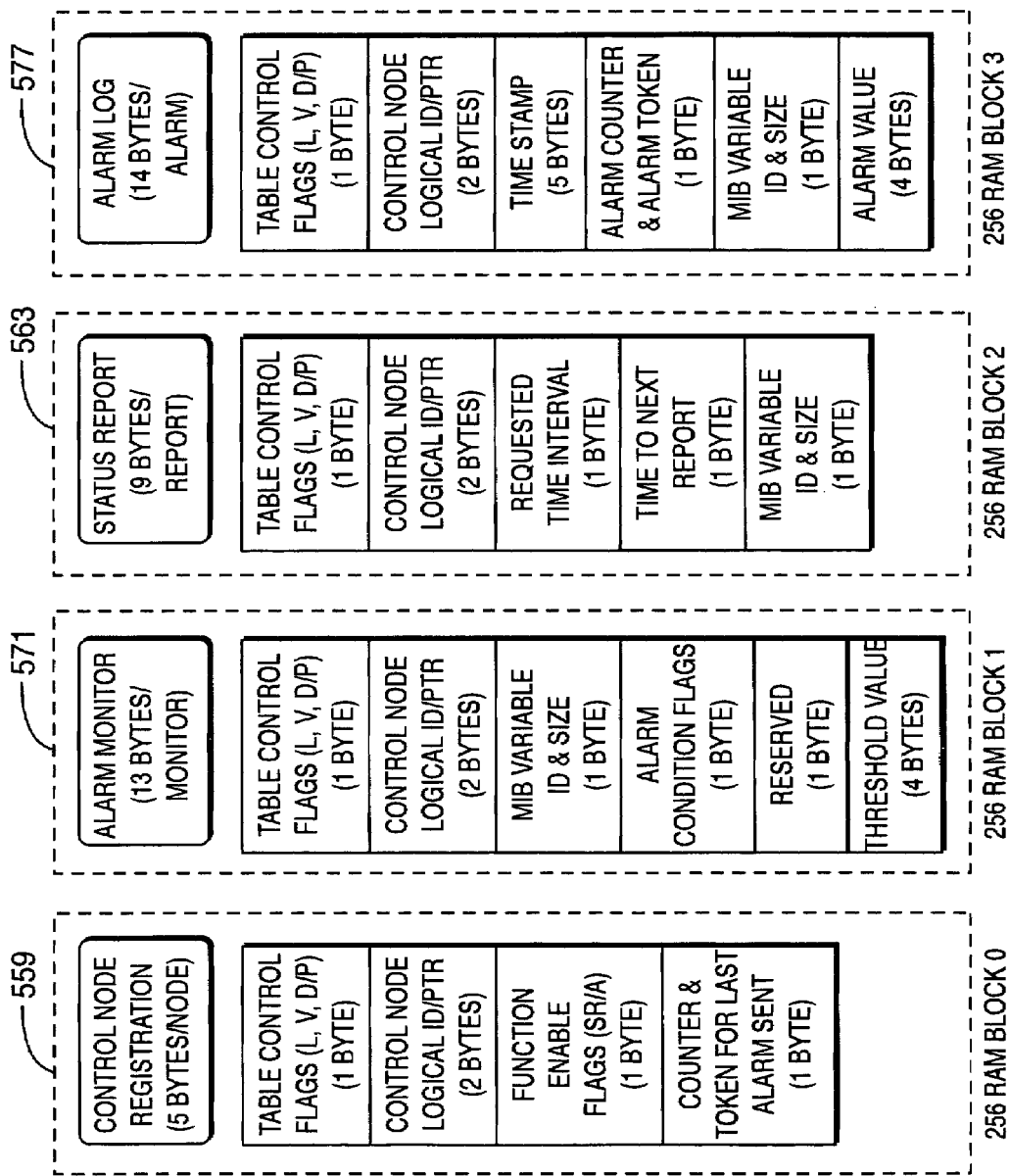
FIG. 12 is a schematic representation of examples of ISD control tables.

FIG. 12 illustrates four example Control Tables 559, 571, 563, 577, internal to ISD device 510, that control its operation and define the services provided by ISD 30 of device 510. Tables 559, 571, 563, 577, are initialized at power up or when a reset command is issued. Each table may utilize a block of RAM, e.g., a 256 byte RAM block.

Control Node Registration 559

The contents of the ISD control table 559 are set internally when a Control Node 10C issues a get_request for alarms or status reports. Table 559 contains control flags that perform as control preferences for each Control Node 10C. The entries are not cleared unless explicitly requested by the network host interface. When a Control Node entry is cleared from this table, all Alarm Monitor 561 and Status Report 563 entries for the Control Node 10C are also cleared. Table 559 includes table control flags, control node 10C logical identifiers, function enable flags, and a counter and token for the last alarm sent.

Alarm Monitor 571

A table 571 entry is created for each Alarm Monitor get_request received 551, 555. Multiple alarms may be triggered for each MIB variable 557 depending upon the setting of the Alarm Condition Flags. The Entry is deleted when an Alarm Cancel get_request is received 551, 555 for a matching Control Node 10C and MIB ID557. Table 571 includes table control flags, control node 10C logical identifiers, MIB variable 557 identifiers, alarm condition flags and a threshold value relating to alarm values.

Status Report 563

Table 563 entries are created and deleted utilizing the same mechanisms described for the Alarm Monitor table 571, and controls reporting 565 of node 10S status information. Status Report table 563 controls the status monitor functions, and includes table control flags, control node 10C logical identifiers, requested time intervals for sensing and/or reporting, the time until the next report, and MIB variable 557 identifiers.

Alarm Log 577

Alarm log 577 contains the last alarms issued 630, 640 by ISD 510, and is stored as a table that uses a circular buffer, which can be scanned with an appropriate get_request command from a control node 10C. Table 577 includes table control flags, control node 10C logical identifiers, alarm time stamps, alarm counter and alarm token data, MIB variable 557 identifiers The first entry in each ISD Control Table 559, 71, 563, 577, contains a set of Control Table Flags. These flags identify the property of each record (or entry) in the table. (See, e.g., Table 13). When initialized, all entries in the table have the L bit set to 0, except for the last entry, where the L bit is set to 1. The V and D/P bits for all entries are initialized to 0. Dependent upon implementation, the D/P may be used to speed up a table scan when the table is sparsely populated. If the table size is small, the time to scan over blank entries (e.g., where the V bit=0) could be less than the time used to maintain the D/P flags for skipping blank entries. Reserved bits 4 . . . 0 are used to support functions unique to each table. For example, alarm monitor table 571 uses these bits to remember the state of the last alarm (out of limits high, low, etc).

TABLE 13

Table Control Flags

| L b7 | V b6 | D/P B5 | Reserved b4 . . . 0 | Function |
|---|---|---|---|---|
| 0 | — | — | — | Not Last Entry in Table |
| 1 | — | — | — | Last Entry in Table |
| — | 0 | — | — | Blank Entry |
| — | 1 | — | — | Valid Entry |
| — | — | 0 | — | Entry is a full data record |
| — | — | 1 | — | Entry is pointer to next record |

The second entry in each ISD Control Table 559, 71, 563, 577, contains a Control Node Logical identifier ID (from the get_request packet) that identifies the control node 10C to which this entry applies. The next elements in each table are function specific. Issuing a hardware reset, or a commanded reset from the network host interface will clear the entire set of ISD Control Tables 559, 71, 563, 577.

MIB variables in table 557 are a preassigned set of system variables that can be maintained from the managing control nodes 10C running TCA software. Each ISD 510 maintains an internal list that indicates which of these variables are writeable (can be changed) by the TCA node 10C. All MIB variables 557 are readable. MIBs are held in scratchpad memory within the on-chip address space of the Parallax Stamp processor 512. This scratch-pad memory contains 64 bytes of MIB variables (numbered 0 through 63), an eight byte MIB definition map, 55 bytes of stack space, and one reserved byte used by the Stamp processor 512. MIB variable number 0 is reserved, and contains the revision number of the MIB table. MIB variables 1 through 63 are defined uniquely for each revision number of the MIB table. Only one assignment set is implemented in a given ISD 510. The MIB definitions for MIB Rev #1 are shown in the section titled STP MIB Definition. All MIBs (0 . . . 63) are readable, but only the MIBs defined in the MIB definition map are writeable. The definition of the MIB table is not changeable on-the-fly. An example layout of the MIB variable storage is shown in FIG. 13 and an actual byte layout for this definition bit map is shown in FIG. 14.

There are eight 2 Kbyte EPROM segments for executable code on the Parallax BS2p24 processor 512. During code execution, each segment has to be independent, and not rely on data declarations used in the other segments. A scratchpad memory location is used to determine which portion of a segment needs to run next. Each of these entry-points are labeled, and defined, in the table of FIG. 15.

ISD Sensor Capability

Each ISD node 10S and device 510 therein can support at least the example sensors indicated below. The analog monitors utilize 8-bit A/D and D/A converters, where necessary.

ISD Internal Sensors
   Analog battery voltage (e.g., 9 v.)
   Analog regulated voltage (e.g., 5 v.)
   Analog Temperature (e.g., in ° F. or ° C.)
   GPS position (latitude/longitude) and time (Z)
   RFID (radio frequency identification) interrogator.

ISD External Sensors
   Seven GPIO ports are provided on ISD Micro Controller 510, and each port can be coupled to any of the following:
   TTL-level input/output (e.g., 5 v.)
   Serial input/output
   Pulse-width modulation output
   RC Time measurement input
   Sine wave generator output
   Digital telephone tone output
   Input pulse measurement
   Output pulse generation
   Shift input from parallel-to-serial register
   Shift output to serial-to-parallel register
   Pulse counter per unit time
   Further, by utilizing a DS1780 I$^2$C Peripheral Monitor 518, the following additional ports are available:
   Analog voltage monitors (e.g., for 3.3 v and 2.5 v)
   Two motor tachometers
   One analog output (8-bit D/A, 0-1.25 v)
   Chassis Intrusion Network Access Point API Different methods may be employed to interface the ISD 10S to the network 200. Two examples include:

1. Using an RS232 interface 553 to a host connected to the network.

2. Directly embedded, where an RS232 interface is not used, but is replaced with message exchanges to the embedded processor 512 running the network stack.

When an RS232 interface (e.g., item 553 in FIG. 11A) is used, software on the host is required to read and write to the ISD interface 553, as well as communicate to the host software operating the network stack. In the directly embedded implementation, the ISD RS232 receive/send packet routines would be replaced by message exchanges with the host network stack.

Using an RS232 interface 553, the host side communication is set to 9600 baud, 8-bit data, 1 stop bit, and CTS/RTS hardware flow-control enabled. The ISD 510 uses CTS/RTS to provide a window for data transfers from the network to the ISD. This window closes with a configurable timeout. If no traffic is seen from the network for a period of time (which also is configurable), the ISD 510 issues 565, 575, an ISD Ready Packet to the host in an attempt to re-register itself with the host interface. Packet transfers 551, 575, to/from the ISD 510 must be specified units of packet size, not individual bytes, or groups of packets.

The application interface 553 simply uses two function calls, one to send packets 575, and the other to receive packets 551:

SendPacket( ) is used to transfer a 16 byte packet from the network interface to the ISD. It returns 0 if successful or a 1 if unsuccessful.
   ReceivePacket( ) is used to receive a 16 byte packet from the ISD. It also returns 0 if successful, and 1 if it failed.

The prototypes for these functions are as follows:

```
int sendPacket(USHORT lhostLA, USHORT lisdLA, UBYTE pkttype,
    UBYTE byte5, UBYTE varsize, UBYTE mib_id, UBYTE *data)
Where:
    hostLA = host logical address
    isdLA = ISD logical address
    pkttype = packet type (0:get, 1:set)
    byte5 = Data Request Byte (composite flags, see Table 3)
    varsize = tokenized size for 1,2,4 or 5 bytes
    mib_id = MIB id
    data = pointer to data that needs to be sent
    int receivePacket(unsigned char *pkt)
Where:
    pkt = pointer to 16 byte array where the arriving data is to be placed
```

These functions have host specific implementations. When reading packets from the ISD 510, it is preferred that received packets are tied to an input file descriptor and the "receivePacket( )" function implements a "select" function to wait until the data is available or until a timeout occurs.

Data Collection Application Example

This section describes an example to configure the ISD 510 to report 563, 565 periodic status reports (voltage, in this example), followed by an example for establishing a trap event alarm monitor for ISD internal temperature out-of-limits condition:

```
        host_id  = 1;
isd_id      = isdLA;
cycle_time = 2;
byte5    = SET_STATUS_REPORT | cycle_time;
nbytes   = 1;
varsize  = stp_varsize[nbytes];
mib_id   = ISD_9V;
for (i=0; i<5; i++) {
    vardata[i]=0;
}
sendPacket(host_id,isd_id,GET_REQUEST,byte5,varsize,mib_id,
    vardata);
receivePacket(packet);
host_id  = 1;
isd_id   = isdLA;
byte5    = SET_ALARM_REPORT;
nbytes   = 1;
varsize  = stp_varsize[nbytes];
mib_id   = ISD_TEMP;
for (i=0; i<5; i++) {
    vardata[i]=0;      // [0]:RLH, [1]:threshold
}
vardata[0] = 5;         // [0]: condition (RLH)
vardata[1] = 31;        // [1]: alarm threshold
    sendPacket(host_id,isd_id,GET_REQUEST,byte5,varsize,mib_id,
        vardata);
receivePacket(packet);
```

STP MIB Definition

This section describes a sample mapping of Variable ID to variables names defined in the ISD MIB table 557. Up to 63 variables can be defined, each 1 byte wide. They can be accessed directly, by specifying the MIB number in byte #10 of the packet protocol, or indexed from this MIB number using the index offset in byte #5 of the packet protocol 400.

```
SP_MIBVERS con 0    ' 1 byte MIB Version number
SP_MYID    con 1    ' 2 byte sensor node id for this ISD
SP_CTSTOUT con 3
```

-continued

```
ISD_LOOPCNT con 4
CN_COUNTER  con 5      'number of control nodes in CN table
AM_COUNTER  con 6      'number of alarm monitors in AM table
SR_COUNTER  con 7      'number of status monitors in SR table
AL_COUNTER  con 8      'number of status monitors in AL table
GPS_DATA    con GPS0   'alias array name for 16 bytes of GPS data
GPS0   con 9    'hr - GMT -
GPS1   con 10   'mi
GPS2   con 11   'sc
GPS3   con 12   'lat3
GPS4   con 13   'lat2
GPS5   con 14   'lat1
GPS6   con 15   'lat0
GPS7   con 16   'long3
GPS8   con 17   'long2
GPS9   con 18   'long1
GPS10  con 19   'long0
GPS11  con 20   'number of visible satellites
GPS12  con 21   'number of tracked satellites
GPS13  con 22   'receiver status 1
GPS14  con 23   'receiver status 0
GPS15  con 24   'GPS Timeout Flag (1=no response from GPS)
SYS_5V    con 25    'system +5v supply (multiplier = 0.026)
SYS_9V    con 26    'system +9v supply (multiplier = 0.0625)
SYS_TEMP  con 27    'system temperature (degrees C)
NAPPERIOD con 28
TESTDATA  con 30
TEST_SEN  con 40    'alarm test button sensor data (0=no alarm)
BEAMB_SEN con 41    'beam-break button sensor data
                    (0=no alarm)
```

Implementation Notes

This section contains notes specific to one particular example embodiment of an ISD device 510, and is described for illustrating certain aspects thereof:

This example ISD 510 embodiment uses alarm threshold values of one byte, yet the protocol allows for 4-byte alarm thresholds. One-byte thresholds are sufficient for many, if not most, sensor alarm applications, and are sufficient to demonstrate full ISD protocol functionality. Embodiments utilizing the Parallax Stamp 512 could support two-byte thresholds, but 3 and 4 byte thresholds would likely require a more capable micro controller. If implemented on an ARM processor, for example, full 4-byte thresholds should be easily supported.

The upper limit on the size of the control tables 559, 571, 563, 577, is determined by the memory capacity of the external I²C RAM components 514, 516. If allocating a 256 byte RAM for each the four control tables 559, 571, 563, 577, then the table sizes in bytes are as follows: Control Nodes:51; Alarm Monitors:19; Status Reports: 22; Alarm Log:18. In the example embodiment, the Control Node table 559 and Status Report table 563 are combined on one RAM device, and partitioned such that they support up to 10 control nodes 10C, and 22 status reports. Also, the Alarm Log 577 is installed in the RTC chip 514 with 240, not 256 bytes of RAM, thus limiting its support to 17 entries in the alarm log 577 instead of 18. In summary, an example ISD embodiment uses one I²C RTC 514 providing 240 bytes of RAM plus two I²C RAM devices 516 each providing 256 bytes of RAM.

The index byte offset in the data request byte (byte #5) of packet 410 is currently preferred to be a times-five offset from the MIB ID, and not a times-one offset. This permits simpler indexed offsets for accessing large data requiring multiple transport packets.

A protocol 60 conversion to a legacy protocol (such as Sensor Link) may be provided to interface the sensor 30 data to an existing tactical control application 20.

Sample command macros provided in the ISD software execute complex commands in the ISD 510 using standard get/set_requests from a control node 10C or from the network host interface. By addressing a predetermined MIB address, the ISD 510 can interpret the variable bytes 430 in packet 410 byte positions 11 through 15 in unique ways. This can be utilized, for example, to reclaim ISD control node/status report/alarm table 559/563/571 memory resources if the network host interface determines that a particular control node 10C no longer exists. Other examples include commands to retrieve or interrogate the alarm log 577 from the control node 10C, or to issue a complete reset to the ISD 510.

The present arrangement can be embodied as a computer implemented process or processes and/or apparatus for performing such computer-implemented process or processes, and can also be embodied in the form of a tangible storage medium containing a computer program or other machine-readable instructions (herein "computer program"), wherein when the computer program is loaded into a computer or other processor (herein "computer") and/or is executed by the computer, the computer becomes an apparatus for practicing the invention. Storage media for containing such computer program include, for example, floppy disks and diskettes, compact disks (CD)-ROMs (whether or not writeable), DVD digital disks, RAM and ROM memories, computer hard drives and back-up drives, and any other storage medium readable by a computer. The invention can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the invention. The invention may be implemented on a general purpose microprocessor or on a digital processor specifically configured to practice the invention. When a general-purpose microprocessor is employed, the computer program code configures the circuitry of the microprocessor to create specific logic circuit arrangements.

While the present invention has been described in terms of the foregoing exemplary embodiments, variations within the scope and spirit of the present invention as defined by the claims following will be apparent to those skilled in the art. For example, any and all transmissions of identification, data and/or other information may be encoded and/or encrypted, as desired.

Because both an ISD node 10S, a control node 10C, a relay node, and a bridge node, employ the same architecture, e.g., as shown in FIG. 1, a node 10 may be configured as either a sensor node 10S or a sensor node 10S, or both, and/or as a bridge or relay node S/S, and/or as a relay node within a network of like radios, by providing and/or removing sensor(s) and/or the ISD 30 and/or TCA 20 functions and/or radio interfaces/adapters.

Further, what is "deemed optimum" may or may not be a true optimum condition, but is the condition deemed to be "optimum" by virtue of its being selected in accordance with the decision rules and/or criteria defined by the applicable controlling function, e.g., the routing protocol with respect to routes between a TCA node 10C and a sensor node 10S.

In addition, there is no inherent limitation as to the number of nodes comprising a piconet or the number of piconets comprising a scatternet, notwithstanding that certain implementations described herein may be so limited. There is likewise not limitation on nodes of any kind joining (e.g., by deployment/activation and/or repositioning/movement) a piconet/scatternet and/or leaving same (e.g., by failure, power source depletion, and/or repositioning/movement).

Finally, numerical values stated are typical or example values, and are not limiting values. For example, introduced jitter may be up to ±10 ms. or could be a lesser or greater value, e.g., up to ±500 ms.

What is claimed is:

1. A node for an ad hoc wireless network comprising a plurality of nodes, said node comprising: a first communication device for transmitting and receiving messages; a first communication interface wrapper coupled to said first communication device for providing messages for transmission by said first communication device and for receiving messages received by said first communication device; a routing protocol core coupled to said first communication interface wrapper for transforming messages from a communication protocol format to a node message format; and a message distribution manager coupled to said routing protocol core and to said first communication interface wrapper for providing messages thereto in the node message format and for receiving messages therefrom in the node message format; wherein messages are transmitted in accordance with at least one policy-based constraint and at least one resource-based constraint; said node further comprising: a sensor device coupled to said message distribution manager for communicating a sensed event to said message distribution manager; and/or a control application coupled to said message distribution manager for providing control messages thereto and for receiving response messages and data messages therefrom; and/or a second communication device for transmitting and receiving messages, and a second communication interface wrapper coupled to said second communication device for providing messages for transmission by said second communication device and for receiving messages received by said second communication device, wherein said second communication interface wrapper is coupled to said message distribution manager and said routing protocol core for providing messages thereto and for receiving messages therefrom.

2. The node of claim 1 wherein said first communication device and/or said second communication device includes a connection-oriented radio device, a connectionless radio device, an 802.11 device and/or a Bluetooth device.

3. The node of claim 1 further comprising a scatternet manager associated with one of said first and second communication devices for discovering neighboring node communication devices and for assigning the discovered communication devices to a piconet for inclusion in a scatternet.

4. The node of claim 1: wherein said policy-based constraint includes any one or more of guaranteed delivery, message retransmission until receipt acknowledged, delaying transmission by a delay and/or a jittered delay, prohibiting use of a specific link, routing for security reasons, applying pre-assigned message priorities, prohibiting transmissions based upon a required minimum and/or maximum time interval between transmissions, discarding data deemed redundant, not transmitting redundant data, and not transmitting a redundant message, and wherein said resource-based constraint includes any one or more of transmission delay, transmission jitter, link utilization, cost, hop count, link reliability, bandwidth, and selection of a link and/or message routing that provides a characteristic that is suitable for the type of data contained in the message.

5. The node of claim 1 wherein said node includes said sensor device and said control application, wherein said message distribution manager communicates messages between said sensor device and said control application without communicating the messages through said routing protocol core.

6. The node of claim 1 wherein said sensor device includes a processor and a plurality of sensors, said processor being responsive to a message received from said message distribution manager for providing an event message.

7. The node of claim 6 wherein the received messages include a get request, a set request, and/or a control message for one of said plurality of sensors.

8. The node of claim 6 wherein said processor collects event data from said plurality of sensors, and provides event messages representative of the event data from said plurality of sensors.

9. The node of claim 8 wherein, once activated to join said network, said plurality of sensors are activated periodically and/or aperiodically, and/or wherein the event messages are provided by said processor periodically and/or aperiodically.

10. The node of claim 6 wherein said plurality of sensors include any one or more of a voltage sensor, a temperature sensor, a timekeeping device, an acoustic sensor, a vibration detector, a seismic detector, a magnetic sensor, an imager, an IR sensor, an IR detector, a trip wire, a break-beam detector, an intrusion detector, an RFID interrogator, a location sensor, and a GPS sensor.

11. The node of claim 1 wherein the first and/or second communication devices thereof transmit messages only in response to an event sensed by said sensor device thereof and/or in response to a request from another node of the network that includes the control application.

12. The node of claim 1 wherein said routing protocol core includes an upper protocol stack and a routing protocol stack for cooperating with said first and/or second communication interface wrappers for accommodating said first and/or second communication devices operating under a plurality of different communication protocols.

13. An ad hoc wireless network comprising a plurality of nodes, each of said plurality of nodes comprising: a first communication device for transmitting and receiving messages; a first communication interface wrapper coupled to said first communication device for providing messages for transmission by said first communication device and for receiving messages received by said first communication device; a routing protocol core coupled to said first communication interface wrapper for transforming messages from a communication protocol format to a node message format; and a message distribution manager coupled to said routing protocol core and to said first communication interface wrapper for providing messages thereto in the node message format and for receiving messages therefrom in the node message format;
wherein messages are transmitted in accordance with at least one policy-based constraint and at least one resource-based constraint; each of said plurality of nodes further comprising: a sensor device coupled to said message distribution manager for communicating a sensed event to said message distribution manager; and/or a control application coupled to said message distribution manager for providing control messages thereto and for receiving response messages and data messages therefrom; and/or a second communication device for transmitting and receiving messages, and a second communication interface wrapper coupled to said second communication device for providing messages for transmission by said second communication device and for receiving messages received by said second communication device, wherein said second communication interface wrapper is coupled to said message distribution manager and said routing protocol core for providing messages thereto and for receiving messages therefrom.

14. The network of claim 13 wherein first ones of said plurality of nodes communicate to define a first piconet.

15. The network of claim 14 wherein second ones of said plurality of nodes communicate to define a second piconet, wherein one of said first ones of said plurality of nodes is included in said second ones of said plurality of nodes to define a scatternet linking the first and second piconets.

16. The network of claim 13 wherein first ones of said plurality of nodes communicate to define a first piconet communicating in a first protocol, and wherein second ones of said plurality of nodes communicate to define a second piconet communicating in a second protocol, wherein one of said plurality of nodes is a relay node including said first and said second communication devices for linking the first and second piconets in a scatternet, wherein said first communication device communicates in the first protocol and said second communication device communicates in the second protocol.

17. The network of claim 13 wherein at least one of said plurality of nodes is a sensor node including at least one said sensor device and wherein at least one of said nodes is a control node including said control application for controlling said sensor node.

18. The network of claim 13 wherein said first communication device and/or said second communication device includes a connection-oriented radio device, a connectionless radio device, an 802.11 device and/or a Bluetooth device.

19. The network of claim 13 wherein one of said plurality of nodes further comprises a scatternet manager associated with one of said first and second communication devices thereof for discovering neighboring node communication devices and for assigning the discovered communication devices to a piconet for inclusion in a scatternet.

20. The network of claim 13 wherein one of said plurality of nodes includes said sensor device and said control application, wherein said message distribution manager of said one of said plurality of nodes communicates messages between said sensor device thereof and said control application thereof without communicating the messages through said routing protocol core thereof.

21. The network of claim 13: wherein said policy-based constraint includes any one or more of guaranteed delivery, message retransmission until receipt acknowledged, delaying transmission by a delay and/or a jittered delay, prohibiting use of a specific link, routing for security reasons, applying pre-assigned message priorities, prohibiting transmissions based upon a required minimum and/or maximum time interval between transmissions, discarding data deemed redundant, not transmitting redundant data, and not transmitting a redundant message, and wherein said resource-based constraint includes any one or more of transmission delay, transmission jitter, link utilization, cost, hop count, link reliability, bandwidth, and selection of a link and/or message routing that provides a characteristic that is suitable for the type of data contained in the message.

22. The network of claim 13 wherein said sensor device of one of said plurality of nodes includes a processor and a plurality of sensors, said processor being responsive to a message received from said message distribution manager of said one of said plurality of nodes for providing an event message.

23. The network of claim 22 wherein the received messages include a get request, a set request, and/or a control message for one of said plurality of sensors.

24. The network of claim 22 wherein said processor collects event data from said plurality of sensors of said one of said plurality of nodes, and provides event messages representative of the event data from said plurality of sensors thereof.

25. The network of claim 24 wherein said plurality of sensors are activated periodically and/or a periodically, and/or wherein the event messages are provided by said processor periodically and/or a periodically.

26. The network of claim 22 wherein said plurality of sensors include any one or more of a voltage sensor, a temperature sensor, a timekeeping device, an acoustic sensor, a vibration detector, a seismic detector, a magnetic sensor, an imager, an IR sensor, an IR detector, a trip wire, a break-beam detector, an intrusion detector, an RFID) interrogator, a location sensor, and a GPS sensor.

27. The network of claim 13 wherein one of said plurality of nodes includes said sensor device and, once activated to join said network, the first and/or second communication devices thereof transmit messages only in response to an event sensed by said sensor device thereof and/or in response to a request from another of said plurality of nodes including said control application.

28. The network of claim 13 wherein said routing protocol core of one of said plurality of nodes includes an upper protocol stack and a routing protocol stack for cooperating with said first and/or second communication interface wrappers thereof for accommodating said first and/or second communication devices operating under a plurality of different communication protocols.

29. A sensor node for a wireless network comprising a plurality of nodes at least one of which is a control node, said sensor node comprising: a plurality of sensors for sensing an event and/or a condition; means for collecting and storing sensed data from said plurality of sensors; means for applying to the stored sensed data at least one policy-based constraint and at least one resource-based constraint; means for storing an identifier of a control node and an associated data request received from the identified control node; and means for sending stored sensed data of an event and/or condition to an identified control node if the stored sensed data satisfies a data request received from the identified control node and/or if the stored sensed data satisfies the policy-based constraint and the resource-based constraint.

30. The sensor node of claim 29 wherein said means for sending periodically sends data representative of a condition of the sensor node.

31. The sensor node of claim 30 wherein the condition of the sensor node includes any one or more of a voltage, a temperature, a time, a location, and a GPS position.

32. The sensor node of claim 29 wherein said means for sending sends data representative of an event upon occurrence of the event.

33. The sensor node of claim 32 wherein the event includes any one or more of an acoustic event, a vibration, a seismic event, a magnetic event, an image, an IR event, a tripped trip wire, a broken break-beam, a made break-beam, an RFID interrogation, and an intrusion.

34. The sensor node of claim 29: wherein said policy-based constraint includes any one or more of guaranteed delivery, message retransmission until receipt acknowledged, delaying transmission by a delay and/or a jittered delay, prohibiting use of a specific link, routing for security reasons, applying pre-assigned message priorities, prohibiting transmissions based upon a required minimum and/or maximum time interval between transmissions, discarding data deemed redundant, not transmitting redundant data, and not transmitting a redundant message, and wherein said resource-based constraint includes any one or more of transmission delay, transmission jitter, link utilization, cost, hop count, link reliability, bandwidth, and selection of a link and/or message routing that provides a characteristic that is suitable for the type of data contained in the message.

35. The sensor node of claim 29 wherein the stored sensed data is in a node protocol, and wherein said means for sending stored sensed data comprises: a communication device for communicating in a communication protocol; and an interface wrapper for providing the stored sensed data to said communication device for transmission in the communication protocol.

36. The sensor node of claim 35 wherein said communication device receives requests for data from a control node in the communication protocol, and wherein said interface wrapper provides the data and requests for data received from the control node in the node protocol.

* * * * *